(12) United States Patent
Azumi et al.

(10) Patent No.: US 8,878,802 B2
(45) Date of Patent: Nov. 4, 2014

(54) DISPLAY UNIT, DISPLAY METHOD, AND ELECTRONIC SYSTEM

(71) Applicant: Japan Display West Inc., Aichi-ken (JP)

(72) Inventors: Kohei Azumi, Tokyo (JP); Yoshitoshi Kida, Kanagawa (JP); Koji Noguchi, Kanagawa (JP)

(73) Assignee: Japan Display West Inc., Aichi (JP)

( * ) Notice: Subject to any disclaimer, the term of this patent is extended or adjusted under 35 U.S.C. 154(b) by 90 days.

(21) Appl. No.: 13/624,540

(22) Filed: Sep. 21, 2012

(65) Prior Publication Data

US 2013/0082954 A1    Apr. 4, 2013

(30) Foreign Application Priority Data

Sep. 30, 2011  (JP) .................................. 2011-215862

(51) Int. Cl.
| | |
|---|---|
| G06F 3/041 | (2006.01) |
| G06F 3/038 | (2013.01) |
| G09G 5/00 | (2006.01) |
| G06F 3/044 | (2006.01) |

(52) U.S. Cl.
CPC .............. *G06F 3/041* (2013.01); *G06F 3/0416* (2013.01); *G06F 3/044* (2013.01)
USPC ............................ 345/173; 345/104; 345/204

(58) Field of Classification Search
USPC ........................................................ 345/173
See application file for complete search history.

(56) References Cited

U.S. PATENT DOCUMENTS

| 5,929,834 | A | * | 7/1999 | Inoue et al. ................... 345/104 |
| 2008/0204433 | A1 | * | 8/2008 | Chen et al. ................... 345/204 |
| 2012/0056835 | A1 | * | 3/2012 | Choo et al. ................... 345/173 |

FOREIGN PATENT DOCUMENTS

| JP | 1992-310995 | A | 11/1992 |
| JP | 1996-076713 | A | 3/1996 |
| JP | 1996-106266 | A | 4/1996 |
| JP | 2003-066417 | A | 3/2003 |
| JP | 2005315925 | A | 11/2005 |
| JP | 2009-258182 | | 11/2009 |
| JP | 2010092275 | A | 4/2010 |

OTHER PUBLICATIONS

Japanese Office Action dated Jun. 3, 2014, issued in connection with counterpart Japanese Patent Application No. 2011-215862.

* cited by examiner

*Primary Examiner* — Charles V Hicks
(74) *Attorney, Agent, or Firm* — Dentons US LLP

(57) ABSTRACT

A display unit includes: a display section; a memory temporarily holding less than one frame of image information; a drive section driving the display section based on the image information which is stored in the memory; and a processing section performing a predetermined process in conjunction with the drive section.

13 Claims, 20 Drawing Sheets

| RT1 |
|---|
| RT2 |
| ////RT3//// |
| RT4 |
| RT5 |
| RT6 |
| RT7 |
| RT8 |
| RT9 |
| RT10 |

} RT

| RT1 |
|---|
| RT2 |
| RT3 |
| ////RT4//// |
| RT5 |
| RT6 |
| RT7 |
| RT8 |
| RT9 |
| RT10 |

} RT

| RT1 |
|---|
| RT2 |
| RT3 |
| RT4 |
| ////RT5//// |
| RT6 |
| RT7 |
| RT8 |
| RT9 |
| RT10 |

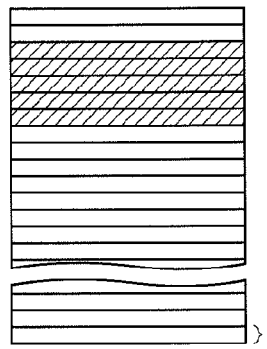 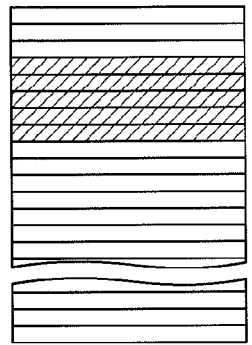 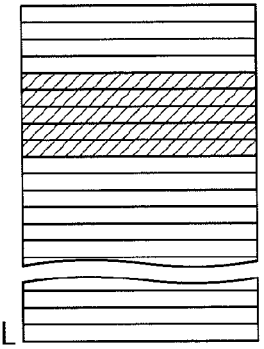
FIG. 21A  FIG. 21B  FIG. 21C
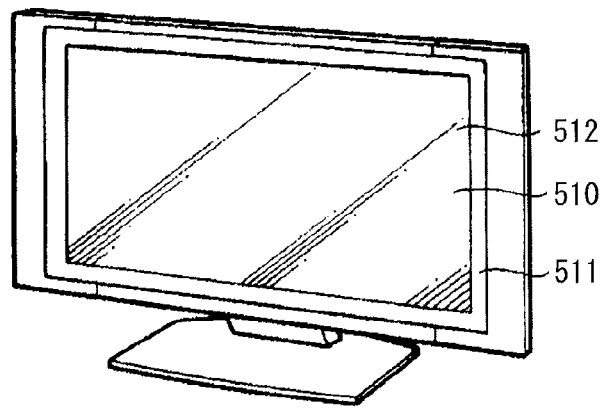
FIG. 22

DISPLAY UNIT, DISPLAY METHOD, AND ELECTRONIC SYSTEM

BACKGROUND

The present disclosure relates to a display unit displaying an image, a display method used for such a display unit, and an electronic unit including such a display unit.

In recent years, display units are incorporated into various electronic systems. Various kinds of display units such as liquid crystal display units, plasma display units, and organic EL display units have been developed in terms of image quality, power consumption, and the like, and display units are applied to various electronic systems including not only stationary televisions, but also cellular phones and portable information terminals according to characteristics of the display units.

A typical display unit includes a memory generally called frame memory. The frame memory temporarily holds one frame of an image signal supplied from an external host of the display unit. Therefore, the display unit performs a display operation at a timing determined by the display unit independently of the image signal, based on the image signal supplied from the external host of the display unit at a timing determined by the host.

In recent years, attention has been given to a display including a contact detection device, i.e., a so-called touch panel mounted on or integrated with a display panel, and displaying various button images and the like on the display panel, thereby allowing a user to input information with use of the button images instead of typical mechanical buttons. As an input device such as a keyboard, a mouse, or a keypad is not necessary for a display including such a touch panel, there is a tendency to expand the use of such a display into not only computers but also portable information terminals such as cellular phones.

There are some kinds of touch panels such as optical touch panels, resistive touch panels, and capacitive touch panels. For example, Japanese Unexamined Patent Application Publication No. 2009-258182 proposes a so-called in-cell type touch detection function-equipped display unit, in which a capacitive touch panel uses a common electrode for display intrinsically included in a display panel as one of a pair of electrodes for a touch sensor, and the other electrode (a touch detection electrode) is disposed to intersect with the common electrode. In the touch detection function-equipped display unit, an AC drive signal reversing its polarity every horizontal period of a display operation is applied to the common electrode to be transmitted to the touch detection electrode through a capacitance between the common electrode and the touch detection electrode. Then, a touch is detected based on a detection signal supplied from the touch detection electrode.

SUMMARY

In recent years, display units have higher resolution. Touch detection function-equipped display units also have higher resolution. Accordingly, frame memories with larger storage capacity are necessary. However, as memories with larger storage capacity are more expensive, cost of the display units may be increased.

It is desirable to provide a display unit allowing a memory to have lower storage capacity, a display method, and an electronic system.

According to an embodiment of the disclosure, there is provided a display unit including: a display section; a memory; a drive section; and a processing section. The memory temporarily holds less than one frame of image information. The drive section drives the display section based on the image information stored in the memory. The processing section performs a predetermined process in conjunction with the drive section.

According to an embodiment of the disclosure, there is provided a display method including: temporarily storing less than one frame of image information in a memory, driving a display section based on the image information stored in the memory, and performing a predetermined process in conjunction with the driving of the display section.

According to an embodiment of the disclosure, there is provided an electronic system including: a display unit; and a control section performing operation control with use of the display unit, in which the display unit includes a display section, a memory temporarily holding less than one frame of image information, a drive section driving the display section based on the image information stored in the memory, and a processing section performing a predetermined process in conjunction with the drive section. The electronic system corresponds to, for example, a television, a digital camera, a personal computer, a video camera, or a portable terminal device such as a cellular phone.

In the display unit, the display method, and the electronic system according to the embodiments of the disclosure, a display drive is performed based on the image information temporarily stored in the memory, and a predetermined process is performed in conjunction with the display drive. At this time, less than one frame of image information is temporarily stored in the memory, and the display drive is performed based on the image information.

In the display unit, the display method, and the electronic system according to the embodiments of the disclosure, less than one frame of image information is temporarily stored in the memory; therefore, the storage capacity of the memory is reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

FIGS. 9A to 9C are schematic views illustrating an example of touch detection scanning in the display panel illustrated in FIG. 4.

FIGS. 21A to 21C are schematic views illustrating an example of touch detection scanning in a display according to a further modification of the embodiment.

FIG. 22 is a perspective view illustrating an external configuration of a television to which the display panel according to the embodiment is applied.

DETAILED DESCRIPTION OF THE PREFERRED EMBODIMENTS

A preferred embodiment of the disclosure will be described in detail below referring to the accompanying drawings. It is to be noted that description will be given in the following order.
1. Basic Principle of Capacitive Touch Detection
2. Embodiment
3. Application Example 1. Basic Principle of Capacitive Touch Detection First, referring to FIGS. 1 to 3, a basic principle of touch detection in a display panel according to an embodiment of the disclosure will be described below. This touch detection system is embodied by a capacitive touch sensor. For example, as illustrated in a part (A) in FIG. 1, a capacitor is configured with use of a pair of electrodes (a drive electrode E1 and a touch detection electrode E2) disposed to face each other with a dielectric D in between. Such a configuration is expressed as an equivalent circuit illustrated in a part (B) in FIG. 1. A capacitor C1 is configured of the drive electrode E1, the touch detection electrode E2, and the dielectric D. In the capacitor C1, first end thereof is connected to an AC signal source (a drive signal source) S, and a second end P thereof is grounded through a resistor R, and is connected to a voltage detector (a touch detection circuit) DET. When an AC rectangular wave Sg (refer to a part (B) in FIG. 3) with a predetermined frequency (for example, approximately a few kHz to tens of kHz) is applied from the AC signal source S to the drive electrode E1 (the first end of the capacitor C1), an output waveform (a touch detection signal Vdet) as illustrated in a part (A) in FIG. 3 appears in the touch detection electrode E2 (the second end P of the capacitor C1). It is to be noted that the AC rectangular wave Sg corresponds to an AC drive signal VcomAC which will be described later.

Figure 1:
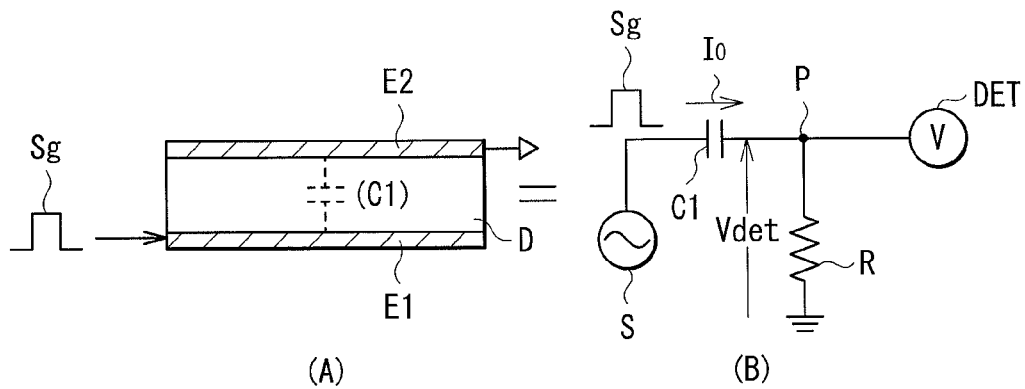
FIG. 1 is a diagram for describing a basic principle of a touch detection system in a display panel according to an embodiment of the disclosure in a state where a finger does not touch the display panel or is not located in proximity to the display panel.

In a state where a finger does not touch (or is not located in proximity to) the touch detection electrode E2, as illustrated in FIG. 1, a current $I_0$ according to the capacitance value of the capacitor C1 flows according to charge and discharge of the capacitor C1. A potential waveform at the second end P of the capacitor C1 at this time is, for example, as illustrated by a waveform $V_0$ in the part (A) in FIG. 3, and the waveform $V_0$ is detected by the voltage detector DET.

Figure 2:
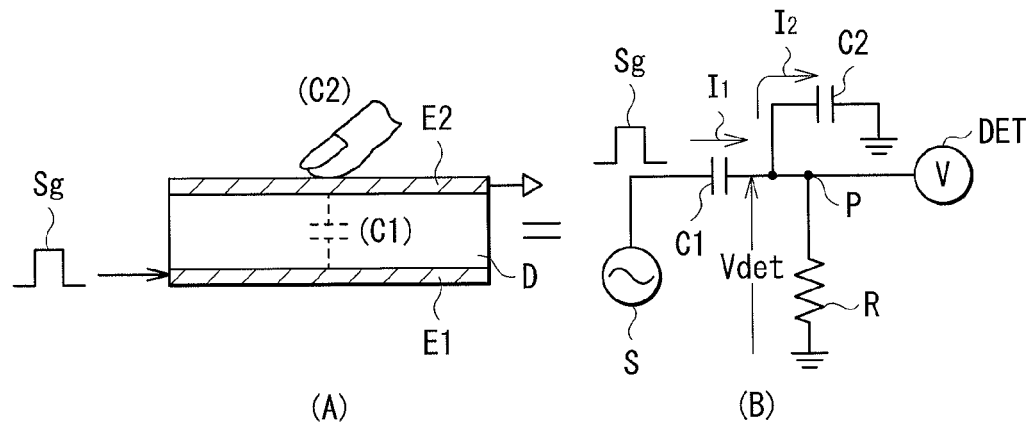
FIG. 2 is a diagram for describing the basic principle of the touch detection system in the display panel according to the embodiment of the disclosure in a state where a finger touches the display panel or is located in proximity to the display panel.
Figure 3:
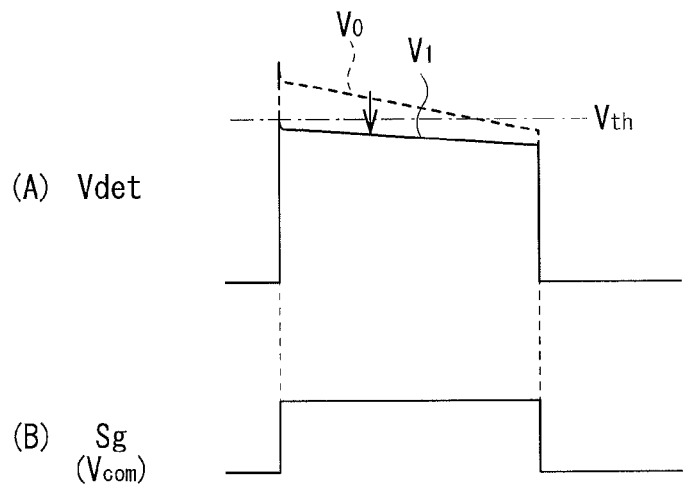
FIG. 3 is a diagram illustrating an example of waveforms of a drive signal and a touch detection signal for describing the basic principle of the touch detection system in the display panel according to the embodiment of the disclosure.

On the other hand, in a state where the finger touches (or is located in proximity to) the touch detection electrode E2, as illustrated in FIG. 2, a capacitor C2 formed by the finger is added to the capacitor C1 in series. In this state, currents $I_1$ and $I_2$ flow according to charge and discharge of the capacitors C1 and C2, respectively. The potential waveform at the second end P of the capacitor C1 at this time is, for example, as illustrated by a waveform $V_1$ in the part (A) in FIG. 3, and the waveform $V_1$ is detected by the voltage detector DET. At this time, the potential at a point P is a divided potential determined by the values of the current $I_1$ and $I_2$ flowing through the capacitors C1 and C2, respectively. Therefore, the waveform $V_1$ has a smaller value than the waveform $V_0$ in a non-touch state. The voltage detector DET compares a detected voltage with a predetermined threshold voltage $V_{th}$, and when the detected voltage is equal to or higher than the threshold voltage $V_{th}$, the voltage detector DET determines that the display panel is in a non-touch state, and when the detected voltage is smaller than the threshold voltage $V_{th}$, the voltage detector DET determines that the display panel is in a touch state. Thus, touch detection is performed.

2. Embodiment

Configuration Example

Entire Configuration Example

Figure 4:
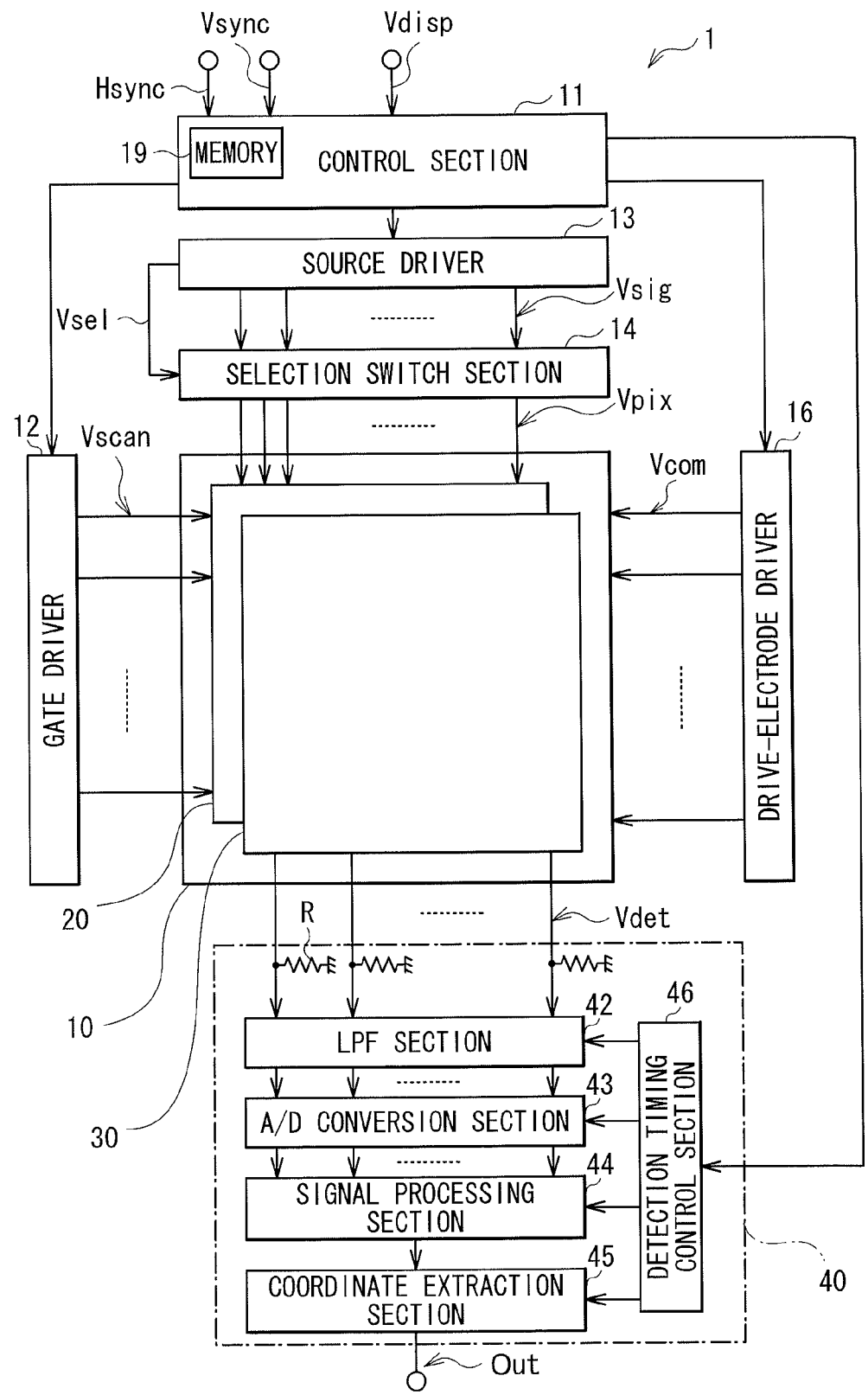
FIG. 4 is a block diagram illustrating a configuration example of the display panel according to the embodiment of the disclosure.

FIG. 4 illustrates a configuration example of a display panel according to the embodiment. A display panel 1 is a so-called in-cell type display unit configured by integrating a liquid crystal display panel and a capacitive touch panel with each other.

The display panel 1 includes a control section 11, a gate driver 12, a source driver 13, a selection switch section 14, a drive-electrode driver 16, a touch detection function-equipped display device 10, and a touch detection section 40.

The control section 11 is a circuit supplying control signals, based on an image signal Vdisp supplied from a host device, to the gate driver 12, the source driver 13, the drive-electrode driver 16, and the touch detection section 40, respectively, to control them to operate in synchronization with one another.

The control section 11 includes a memory 19 temporarily holding image information of the image signal Vdisp. The storage capacity of the memory 19 in this example corresponds to a data amount of one-tenth of one frame of image information. In other words, for example, in the case where display resolution in a vertical direction is 1280 pixels, the memory 19 holds 128 lines of image information.

The image information of the image signal Vdisp supplied from the host device is written to the memory 19 in synchronization with a vertical synchronization signal Vsync and a horizontal synchronization signal Hsync supplied from the host device in a similar manner. Then, the written image information is read from the memory 19 in synchronization with an internal clock of the display panel 1 at higher speed than write speed. More specifically, data of one tenth of one frame of image information is sequentially written to the memory 19 from one horizontal line to another, and then the written data of the one tenth is overwritten with data of the next one-tenth sequentially from one horizontal line to another in a similar manner. Then, the written data is read from the memory 19 sequentially from one horizontal line to another at higher speed than write speed before erasing the written data by writing another data over it. Next, in the display panel 1, as will be described later, display based on the read data is performed in each of display sub-regions RD, which are ten equal parts into which a display screen is partitioned in a vertical direction.

The gate driver 12 has a function of sequentially selecting one target horizontal line for a display drive of the touch detection function-equipped display device 10 in response to the control signal supplied from the control section 11. More specifically, as will be described later, the gate driver 12 applies a scanning signal Vscan to the gates of the TFT devices Tr of the pixels Pix through a scanning-signal line GCL to sequentially select one target line (one target horizontal line) of pixels Pix for a display drive from the pixels Pix arranged in a matrix in a liquid crystal display device 20 of the touch detection function-equipped display device 10.

The source driver 13 generates and outputs a pixel signal Vsig based on the image signal and the control signal supplied from the control section 11. More specifically, as will be described later, the source driver 13 generates, from an image signal for one horizontal line, a pixel signal Vsig by time-division multiplexing pixel signals Vpix of a plurality of (three in this example) sub-pixels SPix of the liquid crystal display device 20 of the touch detection function-equipped display device 10, and supplies the pixel signal Vsig to the selection switch section 14. Moreover, the source driver 13 has a function of generating switch control signals Vsel (VselR, VselG, and VselB) which are necessary to separate, into the pixel signals Vpix, the pixel signal Vsig generated by multiplexing, and supplying, to the selection switch section 14, the switch control signals Vsel together with the pixel signal Vsig. It is to be noted that the pixel signals Vpix are multiplexed to reduce the number of wiring lines between the source driver 13 and the selection switch section 14.

The selection switch section 14 separates, into the pixel signals Vpix, the pixel signal Vsig generated by time-division multiplexing, based on the pixel signal Vsig and the switch control signals Vsel supplied from the source driver 13, and supplies the pixel signals Vpix to the liquid crystal display device 20 of the touch detection function-equipped display device 10.

Figure 5:
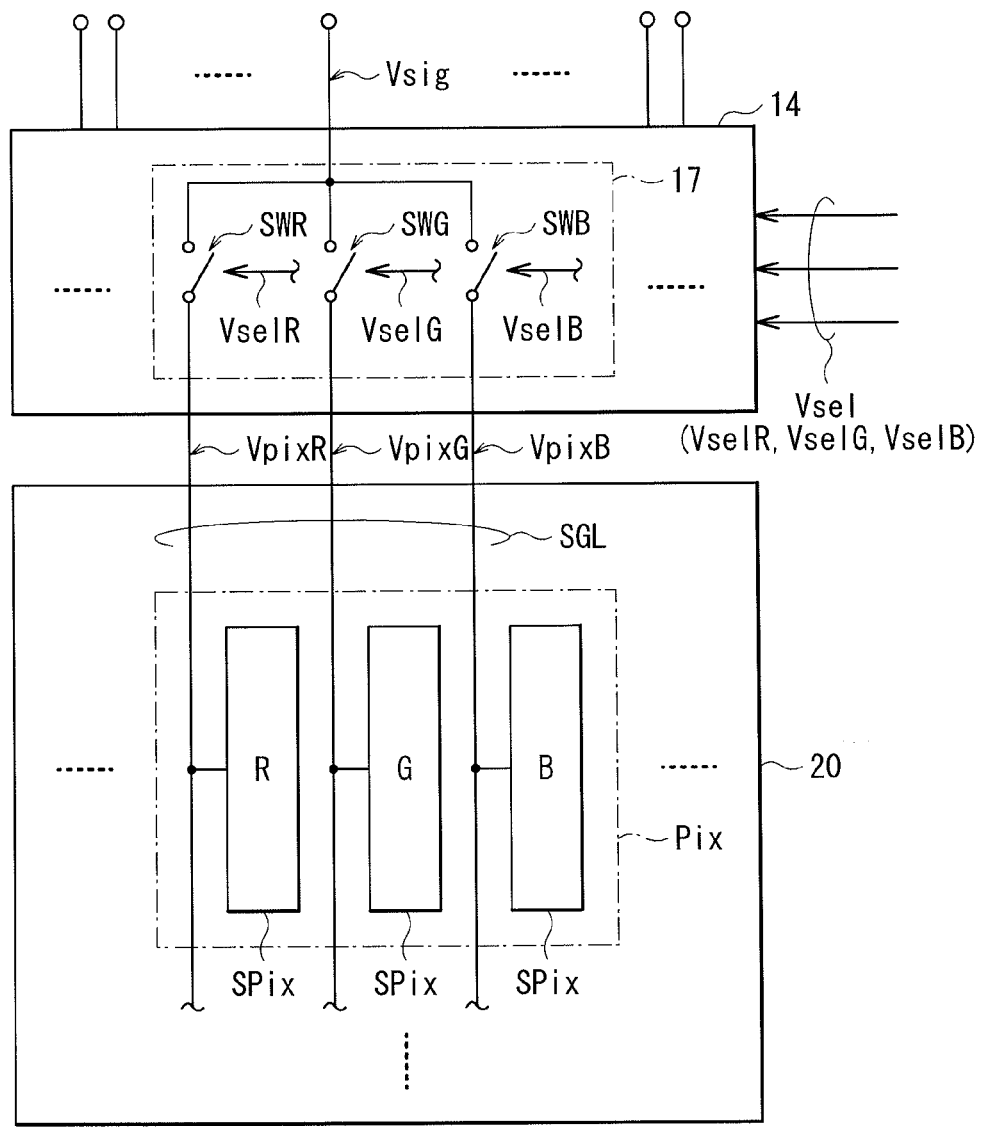
FIG. 5 is a block diagram illustrating a configuration example of a selection switch section illustrated in FIG. 4.

FIG. 5 illustrates a configuration example of the selection switch section 14. The selection switch section 14 includes a plurality of switch groups 17. In this example, each of the switch groups 17 includes three switches SWR, SWG, and SWB, and first ends of the switches SWR, SWG, and SWB are connected to one another, and the pixel signal Vsig is supplied from the source driver 13 to the first ends, and second ends of the switches SWR, SWG, and SWB are connected to three sub-pixels SPix (R, G, and B) of the pixel Pix, respectively, through pixel-signal lines SGL of the liquid crystal display device 20 of the touch detection function-equipped display device 10. On-off operations of the three switches SWR, SWG, and SWB are controlled by the switch control signals Vsel (VselR, VselG, and VselB) supplied from the source driver 13, respectively. By this configuration, the selection switch section 14 performs a function of sequentially switching on the three switches SWR, SWG, and SWB in response to the switch control signals Vsel in a time-divisional manner, thereby separating, into the pixel signals Vpix (VpixR, VpixG, and VpixB), the pixel signal Vsig generated by multiplexing. Then, the selection switch section 14 supplies the pixel signals Vpix to the three sub-pixels SPix, respectively.

The drive-electrode driver 16 is a circuit supplying a drive signal Vcom to drive electrodes COML which will be described later of the touch detection function-equipped display device 10 in response to the control signal supplied from the control section 11. More specifically, as will be described later, the drive-electrode driver 16 applies a DC drive signal VcomDC to the drive electrodes COML in a display period Pd. Moreover, as will be described later, the drive-electrode driver 16 applies an AC drive signal VcomAC to a target drive electrode COML for a touch detection operation in a touch detection period Pt, and applies the DC drive signal VcomDC to other drive electrodes COML. At this time, the drive-electrode driver 16 drives the drive electrodes COML in each of blocks (detection sub-regions RT which will be described later) configured of a predetermined number of drive electrodes COML. Moreover, as will be described later, the drive-electrode driver 16 allows the frequency of the AC drive signal VcomAC to be varied.

The touch detection function-equipped display device 10 is a display device having a touch detection function. The touch detection function-equipped display device 10 includes the liquid crystal display device 20 and a touch detection device 30. As will be described later, the liquid crystal display device 20 is a device performing display while sequentially performing scanning from one horizontal line to another in response to the scanning signal Vscan supplied from the gate driver 12. At this time, the liquid crystal display device 20 performs display in each of the display sub-regions RD, i.e., ten equal parts into which the display screen is partitioned in the vertical direction, while sequentially performing scanning from one horizontal line to another. The touch detection device 30 operates based on the basic principle of the above-described capacitive touch detection to output the touch detection signal Vdet. As will be described later, the touch detection device 30 performs touch detection while sequentially performing scanning based on the AC drive signal VcomAC supplied from the drive-electrode driver 16.

The touch detection section 40 is a circuit detecting whether or not the touch detection device 30 is touched, based on the control signal supplied from the control section 11 and the touch detection signal Vdet supplied from the touch detection device 30 of the touch detection function-equipped display device 10 to determine coordinates or the like of a touched position in a touch detection region when a touch is detected. The touch detection section 40 includes a LPF (Low Pass Filter) section 42, an A/D conversion section 43, a signal processing section 44, a coordinate extraction section 45, and a detection timing control section 46. The LPF section 42 is a low pass filter removing a high-frequency component (a noise component) included in the touch detection signal Vdet supplied from the touch detection device 30 to extract and output a touch component. A resistor R for supplying a DC potential (for example, 0 V) is connected between each input terminal of the LPF section 42 and a ground. The A/D conversion section 43 is a circuit sampling an analog signal supplied from the LPF section 42 at a timing in synchronization with the AC drive signal VcomAC to convert the analog signal into a digital signal. The signal processing section 44 is a logic circuit detecting whether or not the touch detection device 30 is touched, based on an output signal from the A/D conversion section 43. The coordinate extraction section 45 is a logic circuit determining touch panel coordinates of a touched position in the touch detection region when the signal processing section 44 detects a touch. The detection timing control section 46 has a function of controlling these circuits to operate in synchronization with one another.

(Touch Detection Function-Equipped Display Device 10)

Next, a configuration example of the touch detection function-equipped display device 10 will be described in detail below.

Figure 6:
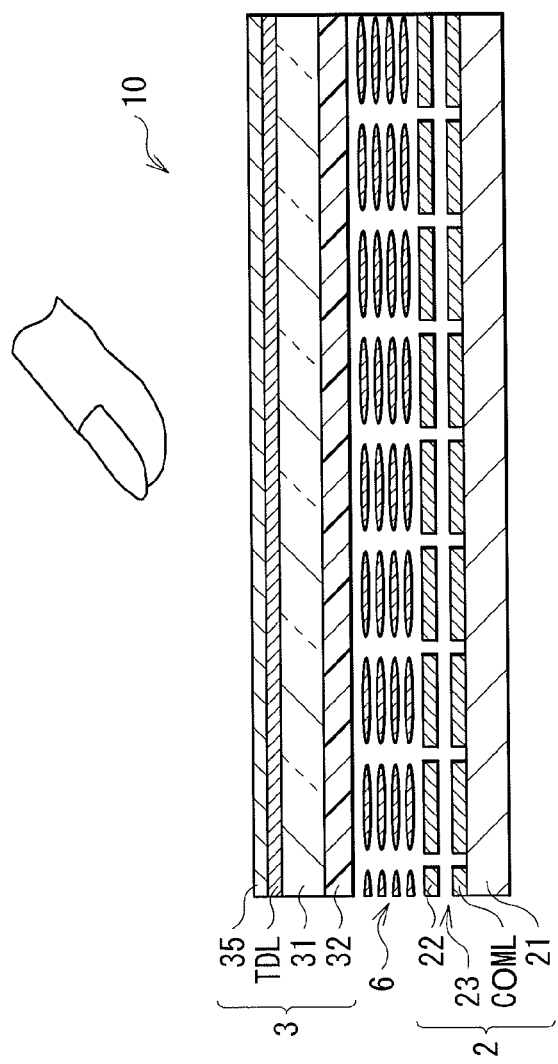
FIG. 6 is a sectional view illustrating a schematic sectional configuration of a touch detection function-equipped display device illustrated in FIG. 4.

FIG. 6 illustrates an example of a sectional configuration of a main part of the touch detection function-equipped display device 10. The touch detection function-equipped display device 10 includes a pixel substrate 2, a counter substrate 3 disposed to face the pixel substrate 2, a liquid crystal layer 6 sandwiched between the pixel substrate 2 and the counter substrate 3.

The pixel substrate 2 includes a TFT substrate 21 as a circuit board, the drive electrodes COML, and pixel electrodes 22. The TFT substrate 21 functions as a circuit board on which various electrodes, wiring, thin film transistors (TFTs), and the like are formed. The TFT substrate 21 is made of, for example, glass. The drive electrodes COML are formed on the TFT substrate 21. The drive electrode COML each are an electrode for supplying a common voltage to a plurality of pixels Pix (which will be described later). The drive electrodes COML each function as a common drive electrode for a liquid crystal display operation and a drive electrode for a touch detection operation. An insulating layer 23 is formed on the drive electrodes COML, and the pixel electrodes 22 are formed on the insulating layer 23. The pixel electrodes 22 each are an electrode for supplying the pixel signal Vpix, and has translucency. The drive electrodes COML and the pixel electrodes 22 are made of, for example, ITO (Indium Tin Oxide).

The counter substrate 3 includes a glass substrate 31, a color filter 32, and touch detection electrodes TDL. The color filter 32 is formed on one surface of the glass substrate 31. The color filter 32 is configured by periodically arranging color filter layers of three colors, for example, red (R), green (G), and blue (B), and a combination of three colors R, G, and B is assigned to each display pixel. Moreover, the touch detection electrodes TDL are formed on the other surface of the glass substrate 31. The touch detection electrodes TDL are made of, for example, ITO, and each are an electrode having translucency. A polarizing plate 35 is disposed on the touch detection electrodes TDL.

The liquid crystal layer 6 functions as a display function layer, and modulates light passing therethrough according to a state of an electric field. The electric field is formed by a potential difference between a voltage of the drive electrode COML and a voltage of the pixel electrode 22. The liquid crystal layer 6 uses a liquid crystal of a transverse electric field mode such as a FFS (Fringe Field Switching) mode or an IPS (In-Plane-Switching) mode.

It is to be noted that alignment films are disposed between the liquid crystal layer 6 and the pixel substrate 2 and between the liquid crystal layer 6 and the counter substrate 3, respectively, and an incident-side polarizing plate is disposed closer to a lower surface of the pixel substrate 2; however, they are not illustrated.

Figure 7:
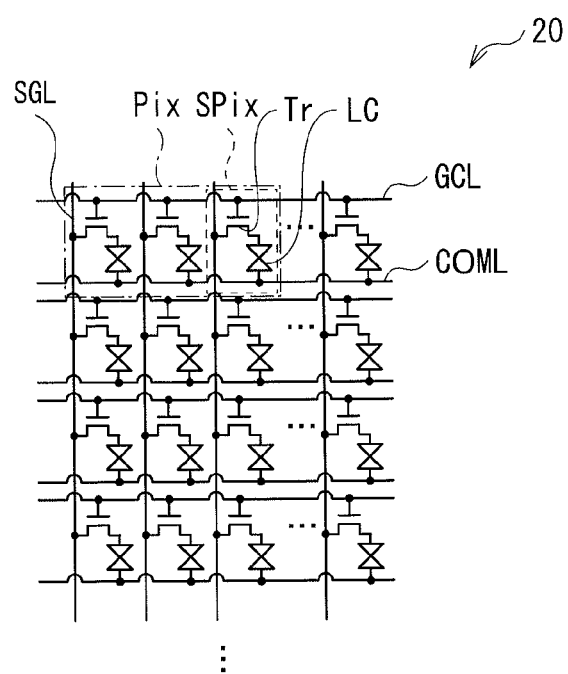
FIG. 7 is a circuit diagram illustrating a pixel arrangement of the touch detection function-equipped display device illustrated in FIG. 4.

FIG. 7 illustrates a configuration example of a pixel configuration in the liquid crystal display device 20. The liquid crystal display device 20 includes a plurality of pixels Pix arranged in a matrix. Each of the pixels Pix is configured of three sub-pixels Spix. The three sub-pixels SPix are arranged to correspond to three colors (RGB) of the color filter 32 illustrated in FIG. 6. The sub-pixels SPix each include a TFT device Tr and a liquid crystal device LC. The TFT device Tr is configured of a thin film transistor, and in this example, the TFT device Tr is configured of an n-channel MOS (Metal Oxide Semiconductor) type TFT. A source of the TFT device Tr is connected to the pixel-signal line SGL, a gate thereof is connected to the scanning-signal line GCL, and a drain thereof is connected to a first end of the liquid crystal device LC. The first end of the liquid crystal device LC is connected to the drain of the TFT device Tr, and a second end thereof is connected to the drive electrode COML.

The sub-pixels SPix belonging to one row in the liquid crystal display device 20 are connected to one another by the scanning signal line GCL. The scanning signal line GCL is connected to the gate driver 12, and the scanning signal Vscan is supplied from the gate driver 12 to the scanning signal line GCL. Moreover, the sub-pixels SPix belonging to one column in the liquid crystal display device 20 are connected to one another by the pixel-signal line SGL. The pixel-signal line SGL is connected to the selection switch section 14, and the pixel signal Vpix is supplied from the selection switch section 14 to the pixel-signal line SGL.

Moreover, the sub-pixels SPix belonging to one row in the liquid crystal display device 20 are connected to one another through the drive electrode COML. The drive electrode COML is connected to the drive-electrode driver 16, and the drive signal Vcom (the DC drive signal VcomDC) is supplied from the drive-electrode driver 16 to the drive electrode COML.

By this configuration, in the liquid crystal display device 20, the gate driver 12 is driven to sequentially scan the scanning-signal lines GCL in a time-divisional manner, thereby sequentially selecting one horizontal line, and the source driver 13 and the selection switch section 14 supply the pixel signal Vpix to the pixels Vpix belonging to the one horizontal line to perform display from one horizontal line to another.

Figure 8:
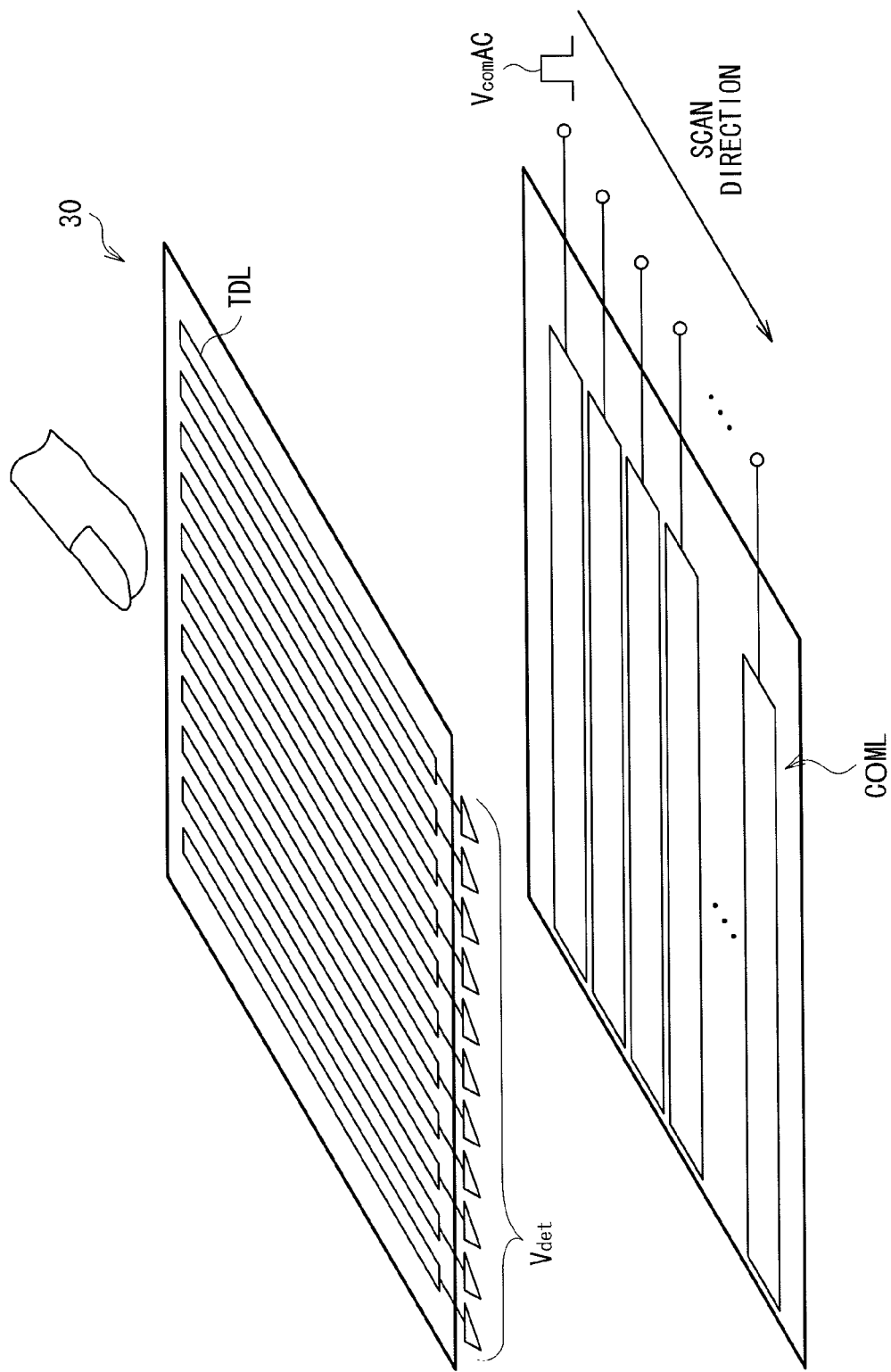
FIG. 8 is a perspective view illustrating a configuration example of drive electrodes and touch detection electrodes in the touch detection function-equipped display device illustrated in FIG. 4.

FIG. 8 illustrates a perspective configuration example of the touch detection device 30. The touch detection device 30 is configured of the drive electrodes COML disposed on the pixel substrate 2 and the touch detection electrodes TDL disposed on the counter substrate 3. The drive electrodes COML each have a strip-like electrode pattern extending in a lateral direction in the drawing. As will be described later, when the touch detection operation is performed, the AC drive signal VcomAC is sequentially supplied to each electrode pattern in each block (the detection sub-region RT which will be described later) configured of a predetermined number of drive electrodes COML to sequentially perform a scanning drive in a time-divisional manner. The touch detection electrodes TDL each have a strip-like electrode pattern extending in a direction intersecting with the direction where the electrode patterns of the drive electrodes COML extend. The respective electrode patterns of the touch detection electrodes TDL are connected to inputs of the LPF section 42 of the touch detection section 40. A capacitance is formed at each of intersections of the electrode patterns of the drive electrodes COML and the electrode patterns of the touch detection electrodes TDL.

By this configuration, in the touch detection device 30, when the drive-electrode driver 16 applies the AC drive signal VcomAC to the drive electrode COML, the touch detection electrode TDL outputs the touch detection signal Vdet to perform touch detection. In other words, the drive electrode COML and the touch detection electrode TDL correspond to the drive electrode E1 and the touch detection electrode E2, respectively, in the basic principle of the touch detection illustrated in FIGS. 1 to 3, and the touch detection device 30 detects a touch based on the basic principle. As illustrated in FIG. 8, the electrode patterns intersecting with each other configure capacitive touch sensors arranged in a matrix. Therefore, scanning is performed over an entire touch detection plane of the touch detection device 30 to allow a position where an external adjacent object touches or is located in proximity to be detected.

FIGS. 9A to 9C schematically illustrate touch detection scanning. In FIGS. 9A to 9C, an operation of supplying the AC drive signal VcomAC to each of detection sub-regions RT1 to RT10 configuring a touch detection plane is illustrated. The width of each detection sub-region RT is determined to be equal to, for example, a width (for example, approximately 5 mm) corresponding to a size of a finger of an operating user. The drive-electrode driver 16 applies the AC drive signal VcomAC to the drive electrodes COML in each detection sub-region RT. Each shaded part in the drawings is the detection sub-region RT to which the AC drive signal VcomAC is supplied, and the DC drive signal VcomDC is supplied to other detection sub-regions RT. As illustrated in FIGS. 9A to 9C, the drive-electrode driver 16 sequentially selects a target detection sub-region RT for the touch detection operation to apply the AC drive signal VcomAC to the drive electrodes COML belonging to the selected detection sub-region RT, thereby performing scanning throughout all of the detection sub-regions RT. It is to be noted that, for convenience of description, the number of the detection sub-regions RT is ten, but the number is not specifically limited thereto.

The touch detection function-equipped display device 10 corresponds to a specific but not limitative example of "display section" in the disclosure. The gate driver 12, the source driver 13, and the drive-electrode driver 16 correspond to specific but not limitative examples of "drive section" in the disclosure. The touch detection section 40 corresponds to a specific but not limitative example of "processing section" in the disclosure.

[Operation and Functions]

Next, the operation and functions of the display panel 1 according to the embodiment will be described below.

(Summary of Entire Operation)

First, referring to FIG. 4, a summary of an entire operation of the display panel 1 will be described below. The control section 11 supplies control signals to the gate driver 12, the source driver 13, the drive-electrode driver 16, and the touch detection section 40, respectively, based on the image signal Vdisp supplied from the host device, thereby controlling them to operate in synchronization with one another. Moreover, the image signal Vdisp supplied from the host device is written to the memory 19 of the control section 11 in synchronization with the vertical synchronization signal Vsync and the horizontal synchronization signal Hsync supplied from the host device in a similar manner, and the written data is read from the memory 19 of the control section 11 in synchronization with an internal clock of the display panel 1 at higher speed than write speed.

The gate driver 12 supplies the scanning signal Vscan to the liquid crystal display device 20 to sequentially select one target horizontal line for a display drive. The source driver 13 generates the pixel signal Vsig by multiplexing the pixel signals Vpix, and the switch control signals Vsel corresponding to the pixel signal Vsig to supply them to the selection switch section 14. The selection switch section 14 generates the pixel signals Vpix by separation of the pixel signal Vsig based on the pixel signal Vsig and the switch control signals Vsel to supply them to respective pixels Pix configuring one horizontal line. The drive-electrode driver 16 applies the DC drive signal VcomDC to all of the drive electrodes COML in the display period Pd. Moreover, in the touch detection period Pt, the drive-electrode driver 16 applies the AC drive signal VcomAC to the drive electrodes COML belonging to a target detection sub-region RT for the touch detection operation, and applies the DC drive signal VcomDC to other drive electrodes COML. The touch detection function-equipped display device 10 performs a display operation in the display period Pd, and performs a touch detection operation in the touch detection period Pt to output the touch detection signal Vdet from the touch detection electrode TDL.

The touch detection section 40 detects a touch on the touch detection plane based on the touch detection signal Vdet. More specifically, the LPF section 42 removes a high-frequency component (a noise component) included in the touch detection signal Vdet to extract and output a touch component. The A/D conversion section 43 converts an analog signal output from the LPF section 42 into a digital signal. The signal processing section 44 detects whether or not the touch detection plane is touched, based on the output signal of the A/D conversion section 43. The coordinate extraction section 45 determines touch panel coordinates of a touched position when the signal processing section 44 detects a touch. The detection timing control section 46 controls the LPF section 42, the A/D conversion section 43, the signal processing section 44, and the coordinate extraction section 45 to operate in synchronization with one another.

(Specific Operation)

Next, the operation of the display panel 1 will be described in more detail referring to some drawings.

Figure 10:
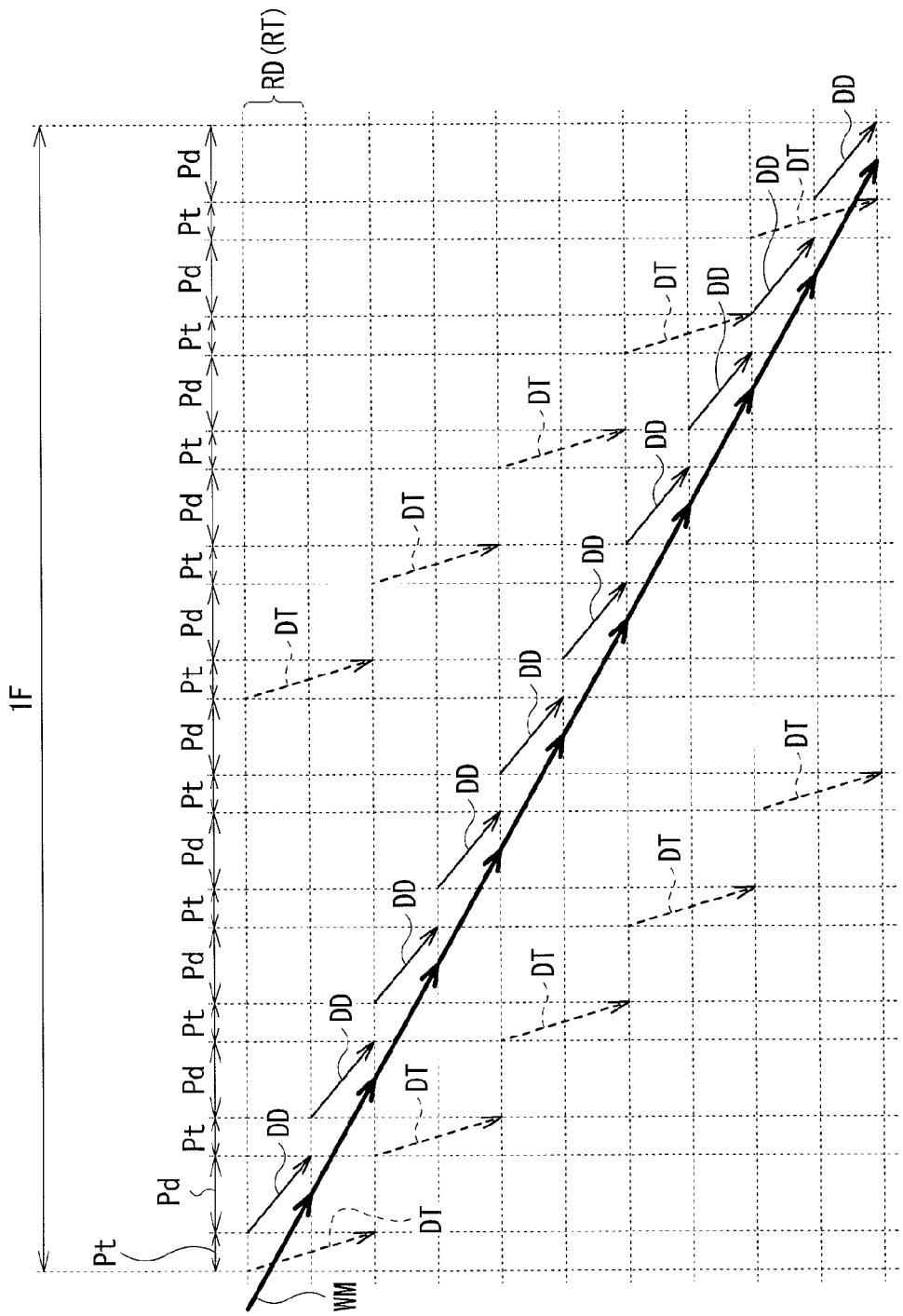
FIG. 10 is a schematic view illustrating an operation example of the display panel illustrated in FIG. 4.

FIG. 10 schematically illustrates an operation of the display panel 1 in one frame period (1F). In FIG. 10, a horizontal axis indicates time and a vertical axis indicates position in a vertical direction in the display screen. It is to be noted that a vertical blanking period is not illustrated in FIG. 10.

Figure 11:
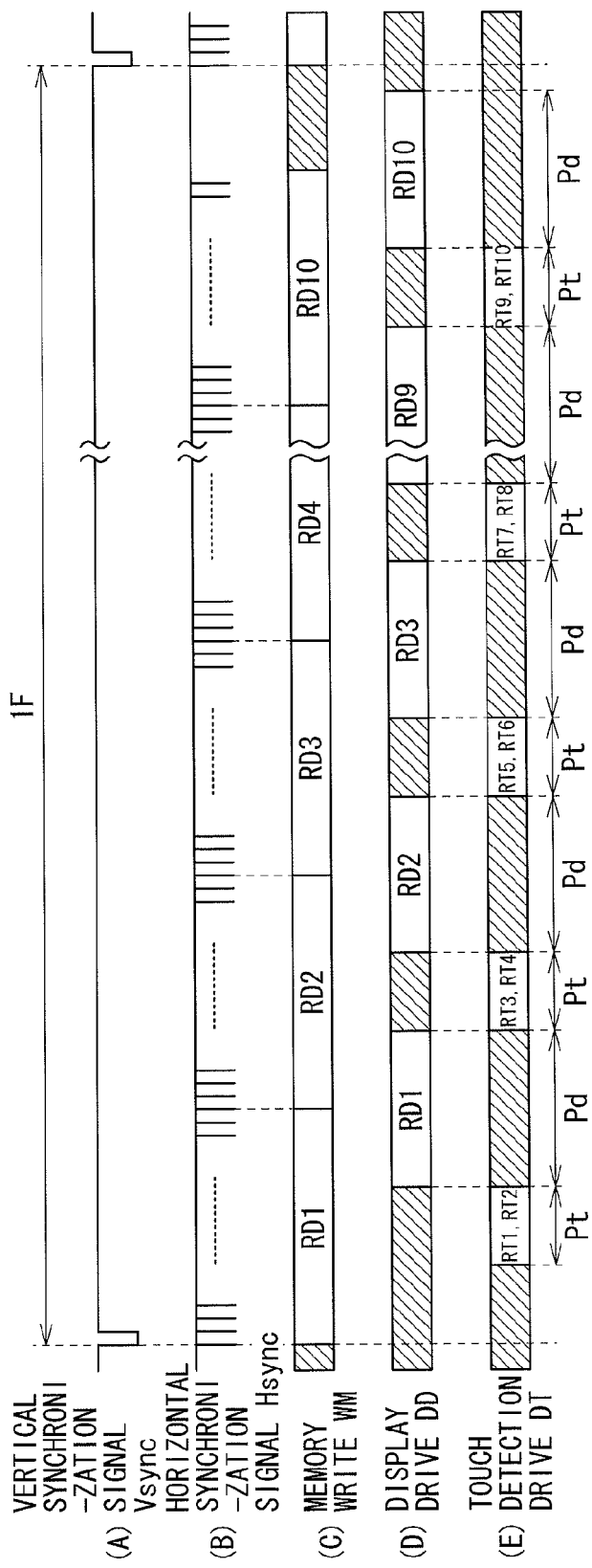
FIG. 11 is a timing chart illustrating an operation example of the display panel illustrated in FIG. 4.

FIG. 11 illustrates a timing chart of the operation of the display panel 1, and parts (A), (B), (C), (D), and (E) illustrate a waveform of the vertical synchronization signal Vsync, a waveform of the horizontal synchronization signal Hsync, a display sub-region RD where image information written by a memory write WM is displayed, a target display sub-region RD for a display drive DD, and a target detection sub-region RT for a touch detection drive DT, respectively.

In one frame period (1F), in this example, ten touch detection periods Pt and ten display periods Pd are alternately arranged. Then, in the display panel 10, the touch detection drive DT is performed in the touch detection periods Pt, and the display drive DD is performed in the display periods Pd.

The display period Pd corresponds to a specific but not limitative example of "first period" in the disclosure. The touch detection period Pt corresponds to a specific but not limitative example of "second period" in the disclosure.

Data of one-tenth of one frame of image information is sequentially written to the memory 19 from one horizontal line to another, based on the image signal Vdisp, the vertical synchronization signal Vsync, and the horizontal synchronization signal Hsync supplied from the host device (memory write WM). Then, in the memory 19, the data of one-tenth is sequentially overwritten with data of the next one-tenth from one horizontal line to another. Moreover, the written data is sequentially read from the memory 19 from one horizontal line to another at higher speed than write speed before erasing the written data by writing another data over it. Then, the gate driver 12 and the source driver 13 drive the display sub-regions RD of the liquid crystal display device 20 based on the read data by line-sequential scanning (display drive DD).

In the display panel 1, the written data is read from the memory 19 from one horizontal line to another at higher speed than the write speed in such a manner, thereby performing the display drive DD based on the read data. In other words, the duration of the display period Pd in which the display drive DD is performed is shorter than a duration in which data of one-tenth of one frame of image information is written to the memory 19. In the display panel 1, the touch detection drive DT is performed in each of the detection sub-region RT with use of time (the touch detection period Pt) secured by shortening the display period Pd in such a manner.

In the touch detection drive DT, as illustrated in FIG. 10, in this example, two detection sub-regions RT are sequentially selected as a drive target in each of the touch detection periods Pt. In other words, in this example, touch detection scanning on the touch detection plane is performed at scanning speed which is twice as high as display scanning speed. In other words, the display panel 1 performs touch detection scanning twice while performing display scanning once. Thus, in the display panel 1, as touch detection scanning is frequently performed, the display panel 1 immediately responds to a touch by the external adjacent object. Therefore, response characteristics for a touch are improved.

(Display Operation and Touch Detection Operation)

Next, the display operation in the display period Pd and the touch detection operation in the touch detection period Pt will be described in more detail below.

Figure 12:
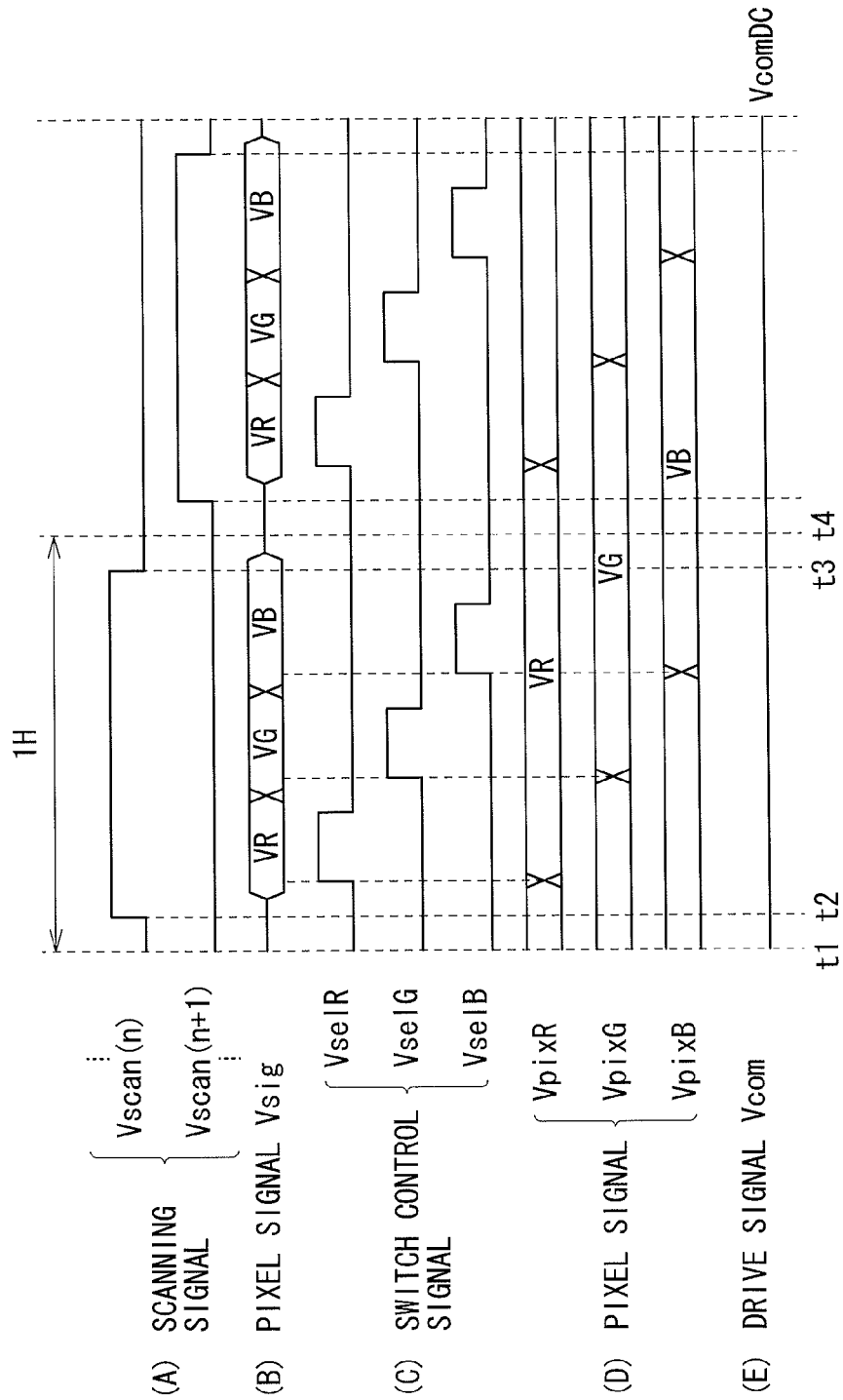
FIG. 12 is a timing chart illustrating an example of a display operation of the display panel illustrated in FIG. 4.

FIG. 12 illustrates a timing chart of the display operation, and parts (A), (B), (C), (D), and (E) illustrate waveforms of the scanning signal Vscan, the pixel signal Vsig, the switch control signal Vsel, the pixel signal Vpix, and the drive signal Vcom, respectively.

In the display panel 1, in the display period Pd, the drive-electrode driver 16 applies the DC drive signal VcomDC to all of the drive electrodes COML (refer to the part (E) in FIG. 12), and the gate driver 12 sequentially applies the scanning signal Vscan to the scanning-signal line GCL in each horizontal period (1H) to perform display scanning. This operation will be described in detail below.

After one horizontal period (1H) starts at a timing t1, the gate driver 12 applies the scanning signal Vscan to a nth scanning-signal line GCL(n) involved in the display operation at a timing t2 to switch the scanning signal Vscan(n) from low level to high level (refer to the part (A) in FIG. 12). Accordingly, the gate driver 12 selects one target horizontal line for the display operation.

Then, the source driver 13 supplies a pixel voltage VR for the red sub-pixel SPix as the pixel signal Vsig to the selection switch section 14 (refer to the part (B) in FIG. 12), and generates a switch control signal VselR switched into high level in a period in which the pixel voltage VR is supplied (refer to the part (C) in FIG. 12). Then, the selection switch section 14 turns on the switch SWR in the period in which the switch control signal VselR is in high level to separate the pixel voltage VR supplied from the source driver 13 from the pixel signal Vsig, and supplies the pixel voltage VR as the pixel signal VpixR to the red sub-pixel SPix through the pixel-signal line SGL (refer to the part (D) in FIG. 12). It is to be noted that the pixel-signal line SGL is turned into a floating state after the switch SWR is turned off; therefore, the voltage of the pixel-signal line SGL is maintained (refer to the part (D) in FIG. 12).

In a similar manner, the source driver 13 supplies a pixel voltage VG for the green sub-pixel Spix together with the corresponding switch control signal VselG to the selection switch section 14 (refer to the parts (B) and (C) in FIG. 12), and the selection switch section 14 separates the pixel voltage VG from the pixel signal Vsig based on the switch control signal VselG to supply the pixel voltage VG as the pixel signal VpixG to the green sub-pixel SPix through the pixel-signal line SGL (refer to the part (D) in FIG. 12).

After that, in a similar manner, the source driver 13 supplies a pixel voltage VB for the blue sub-pixel Spix together with the corresponding switch control signal VselB to the selection switch section 14 (refer to the parts (B) and (C) in FIG. 12), and the selection switch section 14 separates the pixel voltage VB from the pixel signal Vsig based on the switch control signal VselB to supply the pixel voltage VG as the pixel signal VpixB to the blue sub-pixel SPix through the pixel-signal line SGL (refer to the part (D) in FIG. 12).

Next, the gate driver 12 switches the scanning signal Vscan (n) of the nth scanning-signal line GCL from high level to low level at a timing t3 (refer to the part (A) in FIG. 12). Accordingly, the sub-pixels Spix in one horizontal line involved in the display operation are electrically separated from the pixel-signal line SGL.

Then, at a timing t4, the horizontal period (1H) is completed, and then a subsequent horizontal period (1H) starts, and a display drive is performed on a subsequent row (a n+1th row).

As the above-described operation is repeated from then on, in the display panel 1, the display operation on the display sub-regions RD is performed by line-sequential scanning in respective display periods Pd.

Figure 13:
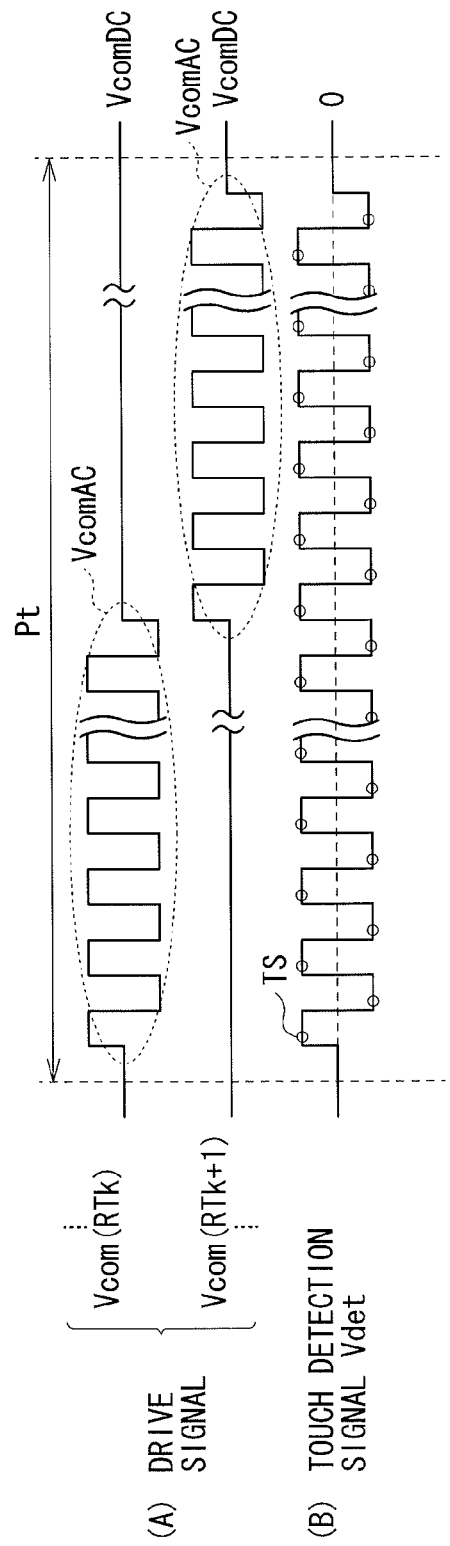
FIG. 13 is a timing chart illustrating an example of a touch detection operation of the display panel illustrated in FIG. 4.

FIG. 13 illustrates a timing chart of the touch detection operation, and parts (A) and (B) illustrate waveforms of the drive signal Vcom and the touch detection signal Vdet, respectively.

The drive-electrode driver 16 sequentially supplies the AC drive signal VcomAC to two detection sub-regions RTk and RTk+1 in the touch detection period Pt (refer to the part (A) in FIG. 13). The AC drive signal VcomAC is transmitted to the touch detection electrode TDL through a capacitance to vary the touch detection signal Vdet (refer to the part (B) in FIG. 13). The A/D conversion section 43 performs A/D conversion on the output signal of the LPF section 42 to which the touch detection signal Vdet is supplied at a sampling timing is in synchronization with the AC drive signal VcomAC (refer to the part (B) in FIG. 13).

Therefore, in the display panel 1, the touch detection operation on the detection sub-regions RTk and RTk+1 is performed in each touch detection period Pt.

(Timings of Memory Write WM and Display Drive DD)

Next, timings of the memory write WM and the display drive DD will be described below.

Figure 14:
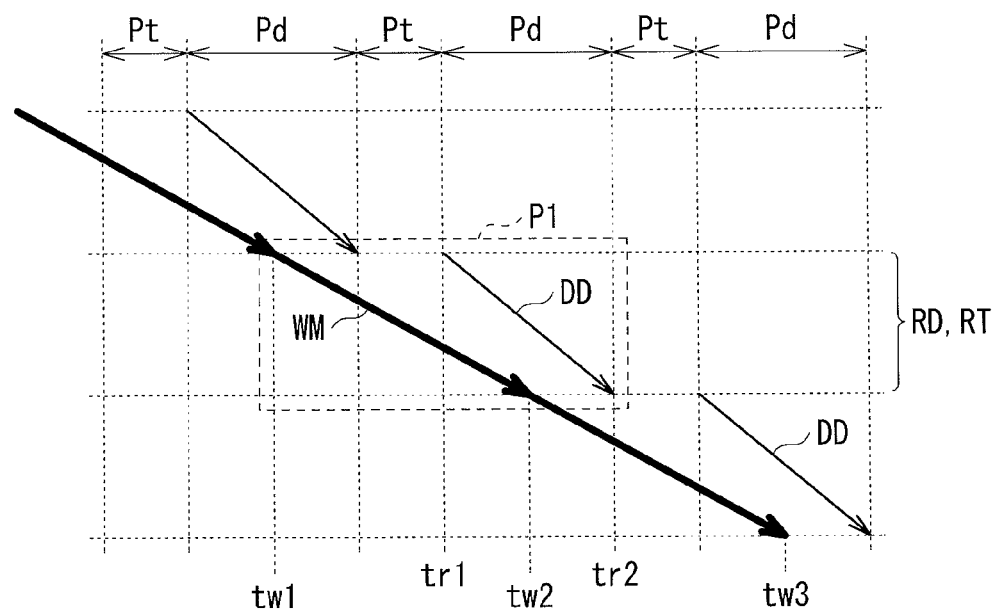
FIG. 14 is a schematic view illustrating timings of a memory write and a display drive in the display panel illustrated in FIG. 4.

FIG. 14 illustrates a timing chart of the memory write WM and a memory read (display drive DD). Data of one-tenth of one frame of image information is sequentially written to the memory 19 from one horizontal line to another (the memory write WM). Then, the written data is sequentially read from the memory 19 from one horizontal line to another before erasing the written data by writing another data over it. Then, the display drive DD is performed based on the read data. In other words, the display drive DD corresponds to data read from a memory (memory read).

In the display panel 1, timings of the memory write WM and the memory read (the display drive DD) are determined to safely read data before erasing data written to the memory 19 by writing another data over it. More specifically, for example, data in an uppermost row of a section P1 is written at a timing tw1, and then is erased at a timing tw2 by writing another data over it; therefore, it is necessary to fix a timing tr1 of the memory read (the display dive DD) for the data between the timing tw1 and the timing tw2. Moreover, data in a lowermost row of the section P1 is written at the timing tw2, and then is erased at a timing tw3 by writing another data over it; therefore, it is necessary to fix a timing tr2 of the memory read (the display drive DD) for the data between the timing tw2 and the timing tw3.

For example, it is desirable to fix the timing tr1 around a midpoint between the timing tw1 and the timing tw2 in consideration of an operation timing margin, and it is desirable to fix the timing tr2 around a midpoint between the timing tw2 and the timing tw3 in a similar manner.

Figure 15:
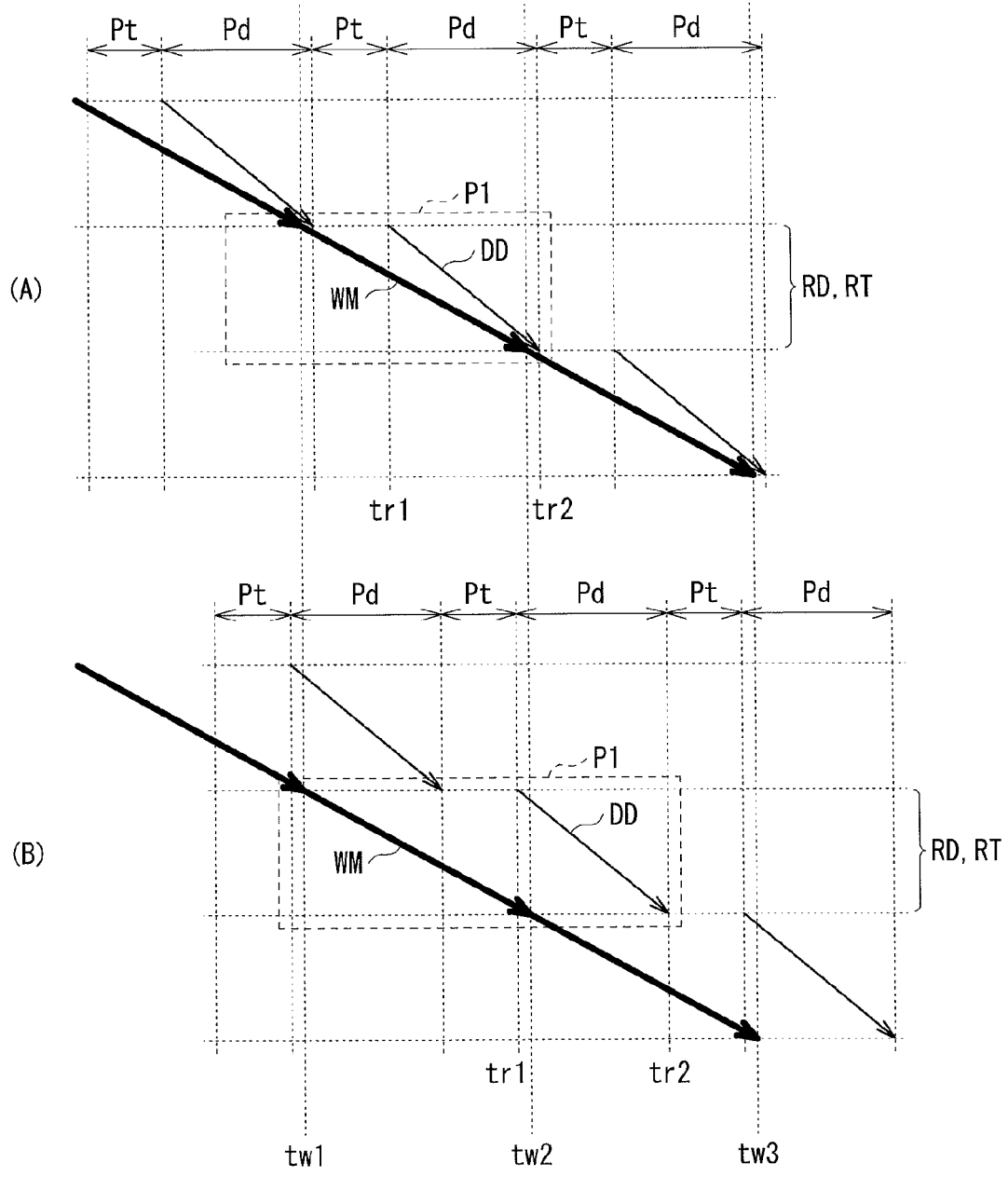
FIG. 15 is a schematic view illustrating timings of the memory write and the display drive in the display panel illustrated in FIG. 4.

FIG. 15 illustrates another timing chart of the memory write WM and the memory read (the display drive DD), where a part (A) illustrates the case where the timing of the display drive DD is earlier and a part (B) illustrates the case where the timing of the display drive DD is slower.

As illustrated in the part (A) in FIG. 15, in the case where the timing of the display drive DD is faster, for example, data in a lowermost row of the section P1 is read at the timing tr2 immediately after being written at the timing tw2; therefore, the timing margin is reduced. On the other hand, as illustrated in the part (B) in FIG. 15, in the case where the timing of the display drive DD is slower, for example, data in an uppermost row in the section P1 is read at the timing tr1 immediately before writing another data at the timing tw2; therefore, the timing margin is reduced in a similar manner.

Therefore, as illustrated in FIG. 14, it is desirable to fix the timings of the memory write WM and the display drive DD to allow a time from the timing tr1 to the timing tw2 to be substantially equal to a time from the timing tw2 to the timing tr2. Thus, the timing margin is increased.

(Prevention of Malfunction in Touch Detection Operation)

In the capacitive touch panel, noise (disturbance noise) caused by an inverter fluorescent lamp, an AM wave, an AC power supply may propagate to the touch panel, thereby causing a malfunction. This malfunction is caused, since it is difficult to distinguish, from disturbance noise, a signal (a touch signal) involved in whether or not the touch panel is touched. In the display panel 1, a frequency of the AC drive signal VcomAC is varied independently of the display drive; therefore, such a malfunction is preventable. More specific description will be given below.

Figure 16:
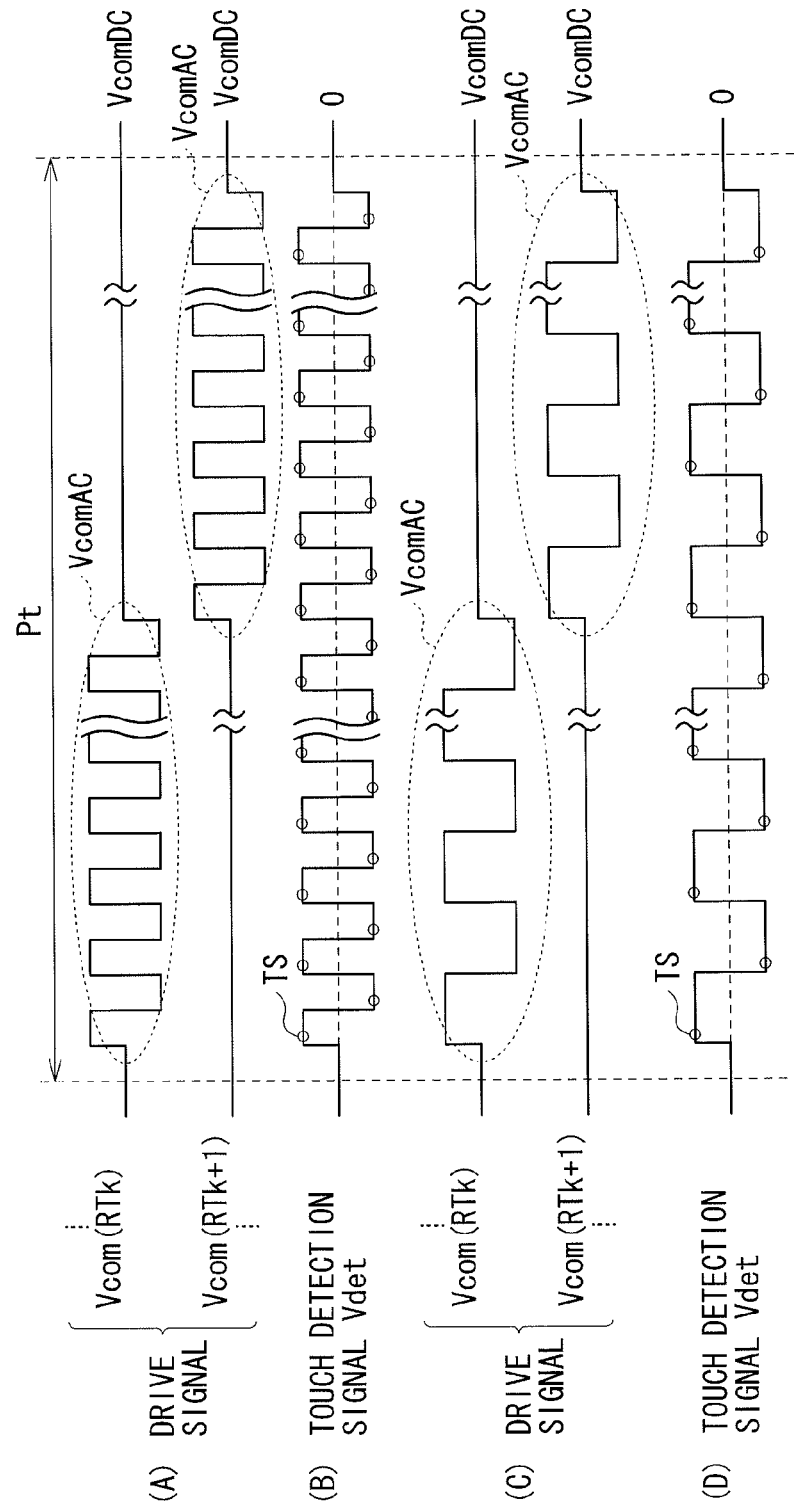
FIG. 16 is a timing chart illustrating another example of the touch detection operation of the display panel illustrated in FIG. 4.

Parts (A) and (B) in FIG. 16 illustrate a timing chart of a touch detection operation in the case where the frequency of the AC drive signal VcomAC is high, and parts (C) and (D) in FIG. 16 illustrate a timing chart of a touch detection operation in the case where the frequency of the AC drive signal VcomAC is low. In FIG. 16, the parts (A) and (C) illustrate the waveform of the drive signal Vcom and the parts (B) and (D) illustrate the waveform of the touch detection signal Vdet.

In the display panel 1, as illustrated in the parts (A) and (C) in FIG. 16, while the frequency of the AC drive signal VcomAC is varied, a sampling frequency in the A/D conversion section 43 is also varied. Accordingly, the possibility of a malfunction in the touch detection operation caused by disturbance noise is reduced.

In other words, in the case where the frequency of disturbance noise is close to the integral multiple of a sampling frequency fs, when A/D conversion is performed on the disturbance noise by the A/D conversion section 43, the disturbance noise appears as so-called folding noise in proximity to a frequency 0. As the folding noise is mixed with a touch signal in proximity to the frequency 0, it is difficult to distinguish the touch signal from a noise signal. The display panel 1 allows the frequency of the AC drive signal VcomAC and the sampling frequency in the A/D conversion section 43 to be varied; therefore, touch detection is performed by selecting a condition not affected by disturbance noise.

In the display panel 1, written data of one-tenth of one frame of image information is read from the memory 19 at higher speed than write speed to reduce the display period Pd, thereby securing the touch detection period Pt. Then, the display panel 1 effectively uses the touch detection period Pt secured in such a manner to vary the frequency of the AC drive signal VcomAC, thereby preventing a malfunction in the touch detection operation.

Comparative Example

Next, effects of the embodiment will be described, compared to a display panel 1R according to a comparative example. The display panel 1R performs both of the display operation and the touch detection operation in one horizontal period (1H). The configuration of the display panel 1R other than the above-described configuration is similar to that according to the embodiment (refer to FIG. 4 and the like).

Figure 17:
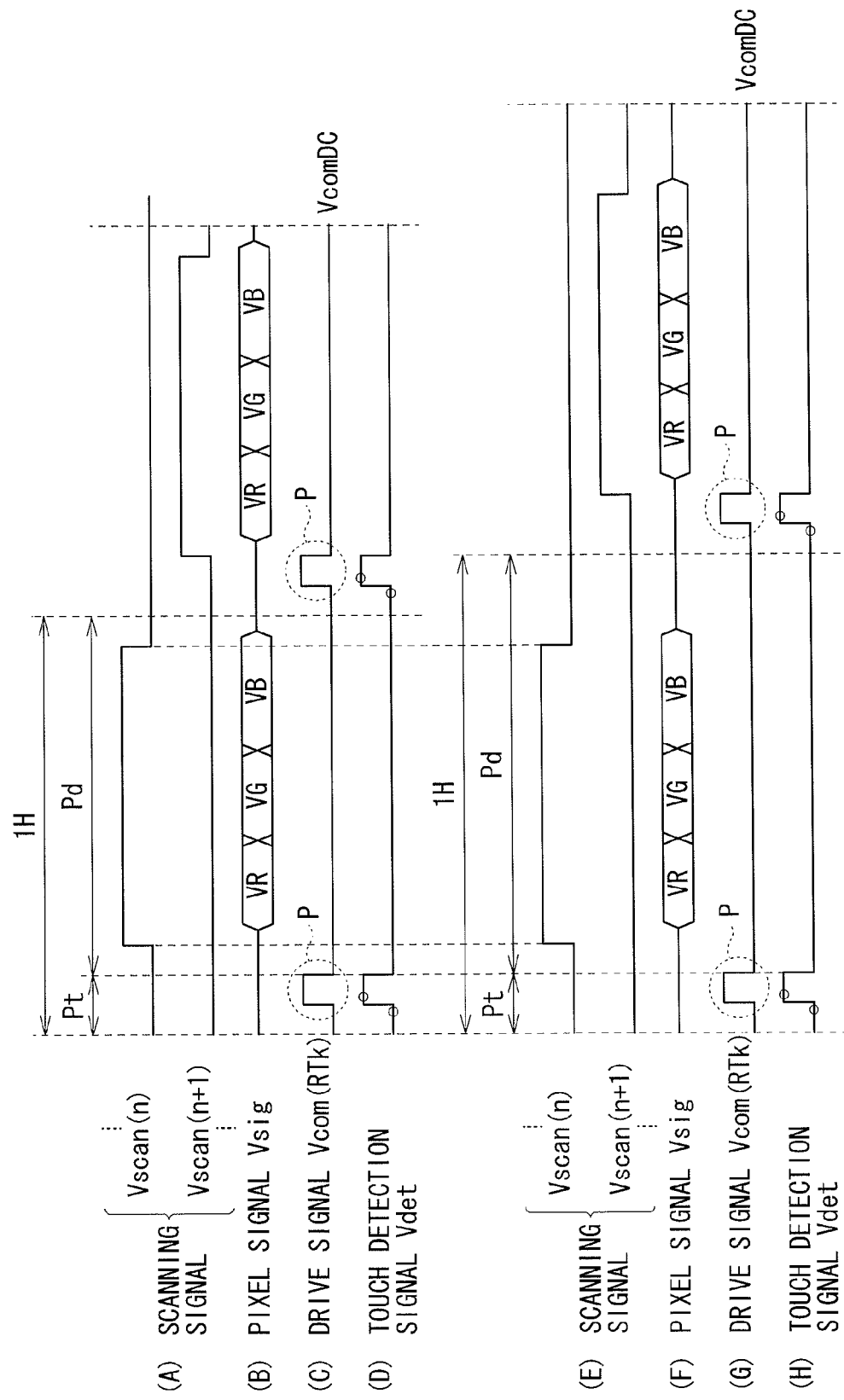
FIG. 17 is a timing chart illustrating an example of a touch detection operation of a display panel according to a comparative example.

FIG. 17 illustrates a timing chart of the display operation and the touch detection operation in the display panel 1R, and parts (A) to (D) illustrate the case where the horizontal period (1H) is reduced, and parts (E) to (H) illustrate the case where the horizontal period (1H) is increased. In FIG. 17, the parts (A) and (E) illustrate the waveform of the scanning signal Vscan, the parts (B) and (F) illustrate the waveform of the pixel signal Vsig, the parts (C) and (G) illustrate the waveform of the drive signal Vcom, and the parts (D) and (H) illustrate the waveform of the touch detection signal Vdet.

In the display panel 1R according to the comparative example, the touch detection period Pt and the display period Pd are provided in one horizontal period (1H). In other words, in one horizontal period (1H), first, the display panel 1R performs the touch detection operation in the touch detection period Pt, and then performs the display operation in the display period Pd.

In the touch detection operation according to the comparative example, first, in the touch detection period Pt, the drive-electrode driver 16 applies a pulse P to the drive electrodes COML belonging to the detection sub-region RTk (refer to the parts (C) and (G) in FIG. 17). The pulse P is transmitted to the touch detection electrode TDL through a capacitance to vary the touch detection signal Vdet (refer to the parts (D) and (H) in FIG. 17). The A/D conversion section 43 performs A/D conversion on an output signal of the LPF section 42 to which the touch detection signal Vdet is supplied at the sampling timing is in synchronization with the pulse P (refer to the parts (D) and (H) in FIG. 17). Thus, the display panel 1R performs the touch detection operation in the detection sub-region RTk. It is to be noted that the display operation is similar to that in the display panel 1 according to the embodiment.

In the display panel 1R according to the comparative example, as illustrated in FIG. 17, the possibility of a malfunction in the touch detection operation caused by disturbance noise is reduced by varying the duration of one horizontal period (1H) and varying the sampling timing in the A/D conversion section 43 in synchronization with varying the duration of the horizontal period (1H). However, in this case, a timing of supplying an image signal to the display panel 1R and a timing of actually performing display are different from each other; therefore, a frame memory is necessary. Moreover, as the duration of one horizontal period (1H) is varied, display image quality may be reduced. Further, as it is difficult to greatly vary the duration of one horizontal period (1H) due to limitations by the display operation, the possibility of a malfunction in the touch detection operation may not be sufficiently reduced.

On the other hand, in the display panel 1 according to the embodiment, the display drive is performed in each display sub-region RD; therefore, the storage capacity of the memory 19 is reduced to approximately a data amount in the display sub-region RD.

Moreover, in the display panel 1, while the duration of the touch detection period Pt and the duration of the display period Pd are maintained constant, the frequency of the AC drive signal VcomAC in the touch detection period Pt is varied. Accordingly, the duration of one horizontal period (1H) in the display period Pd is maintained constant; therefore, a possibility of a reduction in display image quality is reduced. Further, in the display panel 1, as the frequency of the AC drive signal VcomAC is easily greatly varied without limitations by the display operation, the possibility of a malfunction in the touch detection operation is reduced, compared to the display panel 1R according to the comparative example.

In other words, in the display panel 1R according to the comparative example, as the touch detection period Pt is provided in one horizontal period (1H), operations capable of being performed in a limited short duration are limited. In other words, in the display panel 1R, flexibility for the touch detection operation is reduced.

On the other hand, in the display panel 1 according to the embodiment, written data of one-tenth of one frame of image information is read from the memory 19 at higher speed than write speed to reduce the display period Pd, thereby securing the touch detection period Pt. In other words, in the display panel 1, as a sufficiently long duration for the touch detection operation is secured, flexibility for the touch detection operation is increased.

[Effects]

As described above, in the embodiment, as the display drive is performed on each display sub-region, the storage capacity of the memory is reduced.

Moreover, in the embodiment, as data is read from the memory at higher speed than write speed, a sufficiently long touch detection period is secured, and flexibility for the touch detection operation is increased.

Further, in the embodiment, the frequency of the AC drive signal is varied in the sufficiently long touch detection period; therefore, the possibility of a malfunction in the touch detection operation is reduced without affecting the display operation.

[Modification 1-1]

Figure 18:
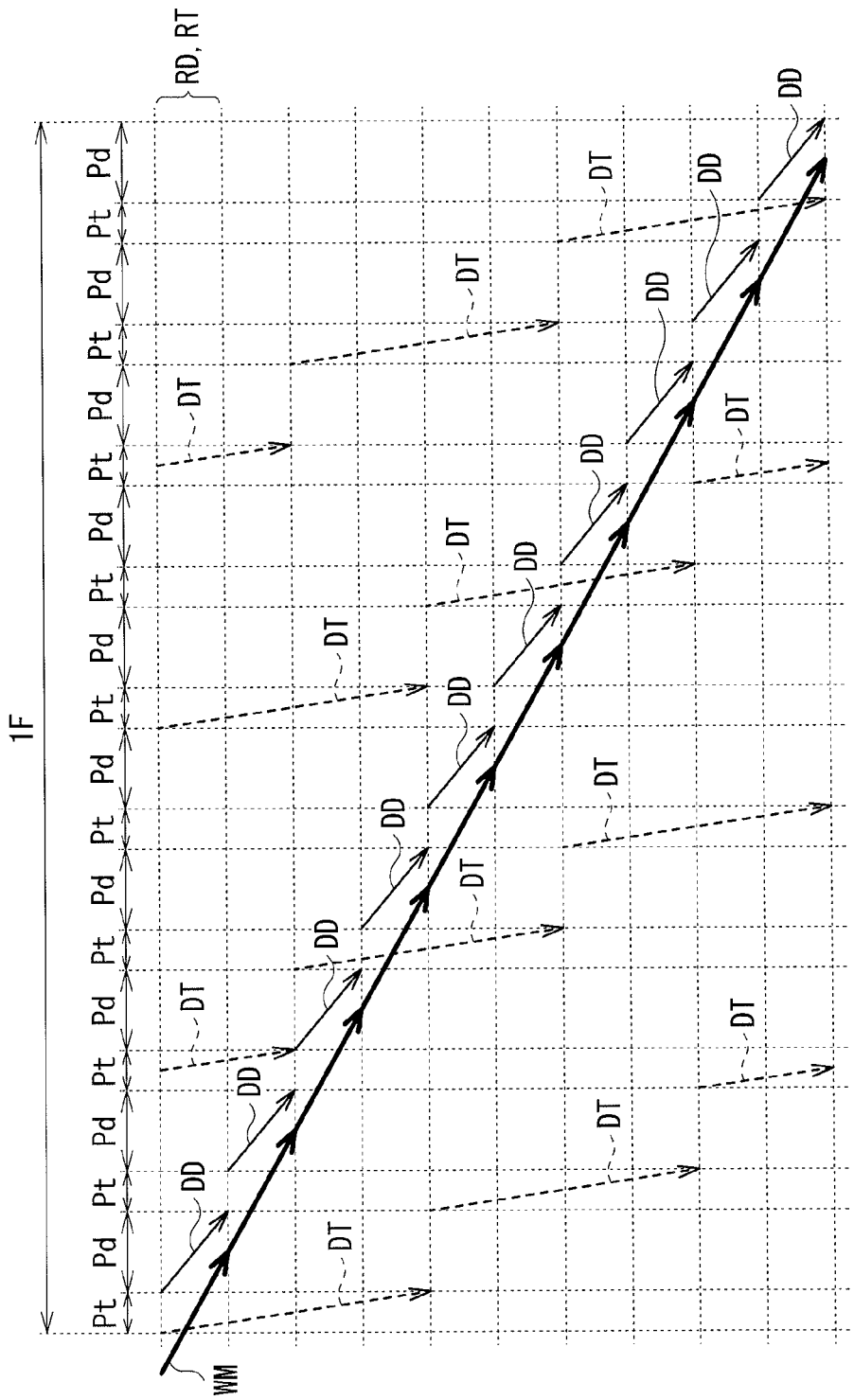
FIG. 18 is a schematic view illustrating an operation example of a display panel according to a modification of the embodiment.

In the above-described embodiment, touch detection scanning is performed at speed which is twice as high as that of display scanning; however, the speed of the touch detection scanning is not limited thereto, and may be lower or higher than speed which is twice as high as that of display scanning. FIG. 18 illustrates an example in the case where touch detection scanning is performed at speed which is four times as high as that of display scanning. In this example, the drive-electrode driver 16 sequentially supplies the AC drive signal VcomAC to four detection sub-regions RT in the touch detection period Pt. Therefore, while display scanning is performed once, touch detection scanning is performed four times.

[Modification 1-2]

Figure 19:
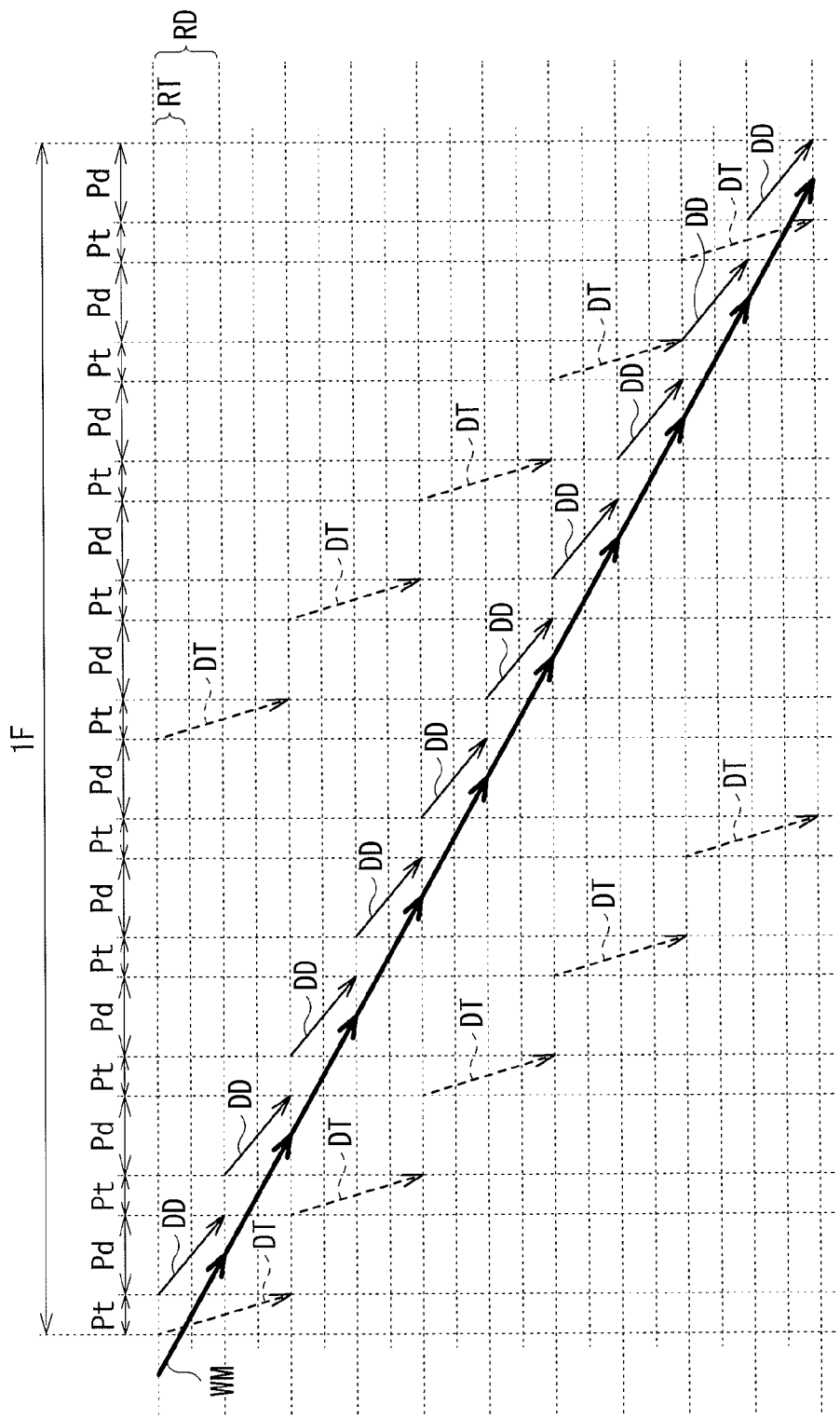
FIG. 19 is a schematic view illustrating an operation example of a display panel according to another modification of the embodiment.

In the above-described embodiment, the display sub-regions RT and the detection sub-regions RD are ten equal parts into which the display plane is partitioned and ten equal part into which the touch detection plane is partitioned, respectively; however, they are not limited thereto. For example, the size of the display sub-region RT and the size of the detection sub-region RD may be different from each other. FIG. 19 illustrates an example in the case where the size of the detection sub-region RT is equal to a half of the size of the display sub-region RD. In this example, the display sub-regions RT are ten equal parts into which the display plane is partitioned, and the detection sub-region RD are twenty equal parts into which the touch detection plane is partitioned.

[Modification 1-3]

Figure 20:
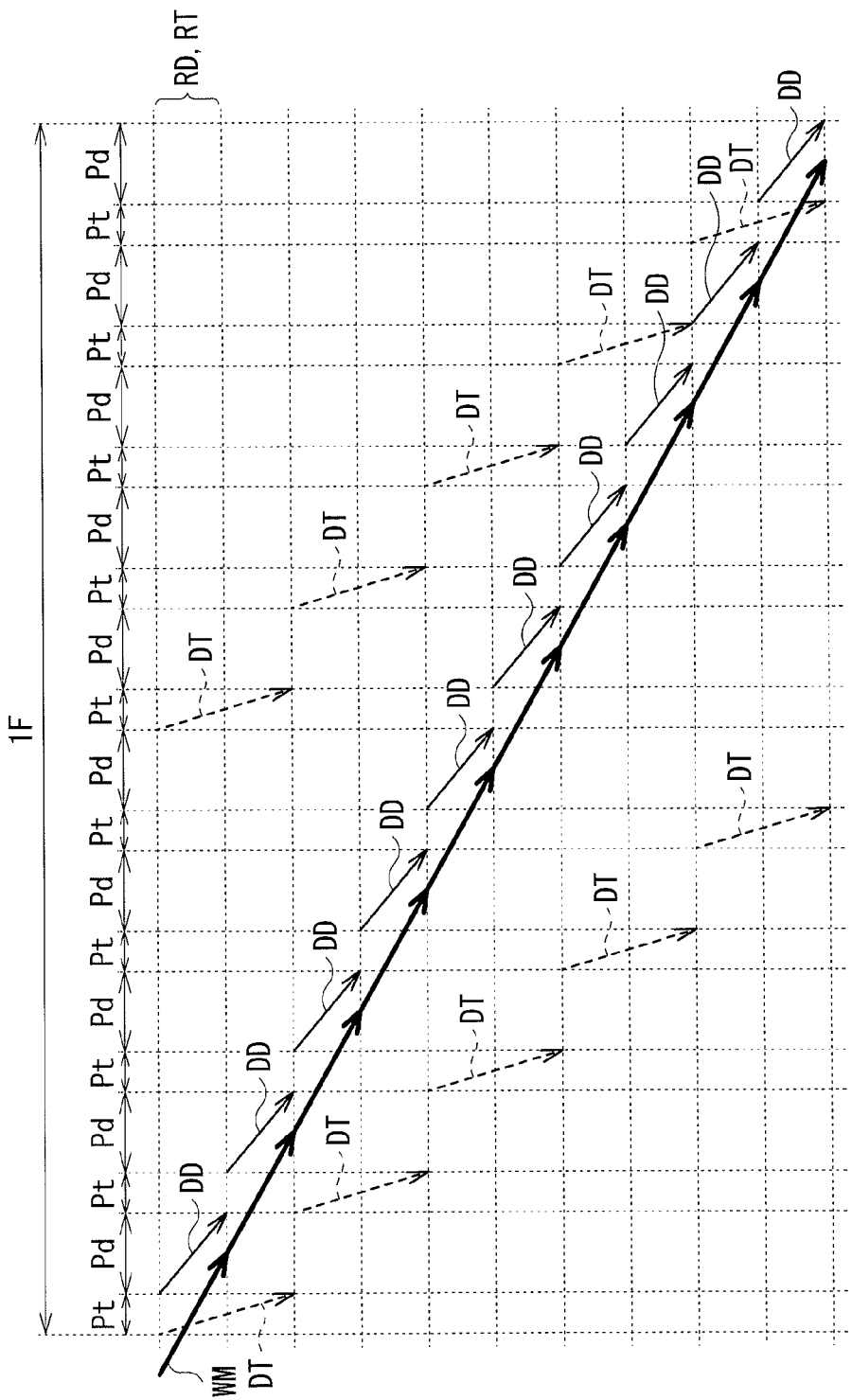
FIG. 20 is a schematic view illustrating an operation example of a display panel according to still another modification of the embodiment.

In the above-described embodiment, the memory 19 temporarily holds data of one display sub-region RD; however, the disclosure is not limited to this case. Alternatively, for example, the memory 19 may temporarily hold data of a plurality of display sub-regions RD. FIG. 20 illustrates an example in the case where the memory 19 temporarily holds data of two display sub-regions RD. Also in this case, compared to a frame memory, the storage capacity of the memory is reduced.

[Modification 1-4]

In the above-described embodiment, during the touch detection operation, scanning is performed on each detection sub-region RT configured of a predetermined number of drive electrodes COML by driving the drive electrodes COML; however, the disclosure is not limited thereto. Alternatively, for example, scanning may be performed by simultaneously driving a predetermined number of target drive electrodes COML and shifting target drive electrodes COML by one. Specific description will be given below.

FIG. 21 schematically illustrates an example of the touch detection operation according to this modification. A drive-electrode driver 16D according to this modification simultaneously applies the AC drive signal VcomAC to the predetermined number of target drive electrodes COML. More specifically, the drive-electrode driver 16D simultaneously applies the AC drive signal VcomAC to the predetermined number (five in this example) of target drive electrodes COML (indicated by a shaded part). Then, the drive-electrode driver 16D performs touch detection scanning by shifting target drive electrodes COML to which the AC drive signal VcomAC is applied by one. It is to be noted that, in this example, the AC drive signal VcomAC is simultaneously applied to five drive electrodes COML; however, the number of target drive electrodes COML is not limited to five, and the AC drive signal VcomAC may be simultaneously applied to four or less or six or more target drive electrodes COML. Moreover, in this example, target drive electrodes COML to which the AC drive signal VcomAC is applied is shifted by one, but the modification is not limited thereto, and the target drive electrodes COML may be shifted by two or more.

[Modification 1-5]

In the above-described embodiment, the storage capacity of the memory 19 corresponds to one-tenth of one frame of image information, but is not limited thereto. Alternatively, for example, the storage capacity of the memory 19 may correspond to one-twentieth or one-fifth of one frame of image information.

[Modification 1-6]

In the above-described embodiment, the drive-electrode driver 16 applies the DC drive signal VcomDC to the drive electrodes COML during the display operation; however, the disclosure is not limited to the case. Alternatively, for example, a so-called COM inversion drive in which an AC drive signal is applied to the drive electrodes COML may be performed.

[Modification 1-7]

In the above-described embodiment, the selection switch section 14 is provided, and the selection switch section 14 separates the pixel signal Vsig supplied from the source driver 13 into the pixel signals Vpix to supply the pixel signals Vpix to the liquid crystal display device 20; however, the disclosure is not limited to this case. Alternatively, the selection switch section 14 may not be provided, and the source driver 13 may directly supply the pixel signals Vpix to the liquid crystal display device 20.

3. Application Examples

Next, application examples of the display panels described in the above-described embodiment and the above-described modifications will be described below.

FIG. 22 illustrates an appearance of a television to which the display panel according to any of the above-described embodiment and the like is applied. The television includes, for example, an image display screen section 510 including a front panel 511 and a filter glass 512, and the image display screen section 510 is configured of the display panel according to any of the above-described embodiment and the like.

The display panels according to the above-described embodiment and the like are applicable to, in addition to such a television, electronic systems in any fields, including digital cameras, notebook personal computers, portable terminal devices such as cellular phones, portable game machines, and video cameras. In other words, the display panels according to the above-described embodiment and the like are applicable to electronic systems in any fields displaying an image.

Although the present disclosure is described referring to the embodiment, the modifications, and the application examples to electronic systems; however, the disclosure is not limited thereto, and may be variously modified.

Figure 23:
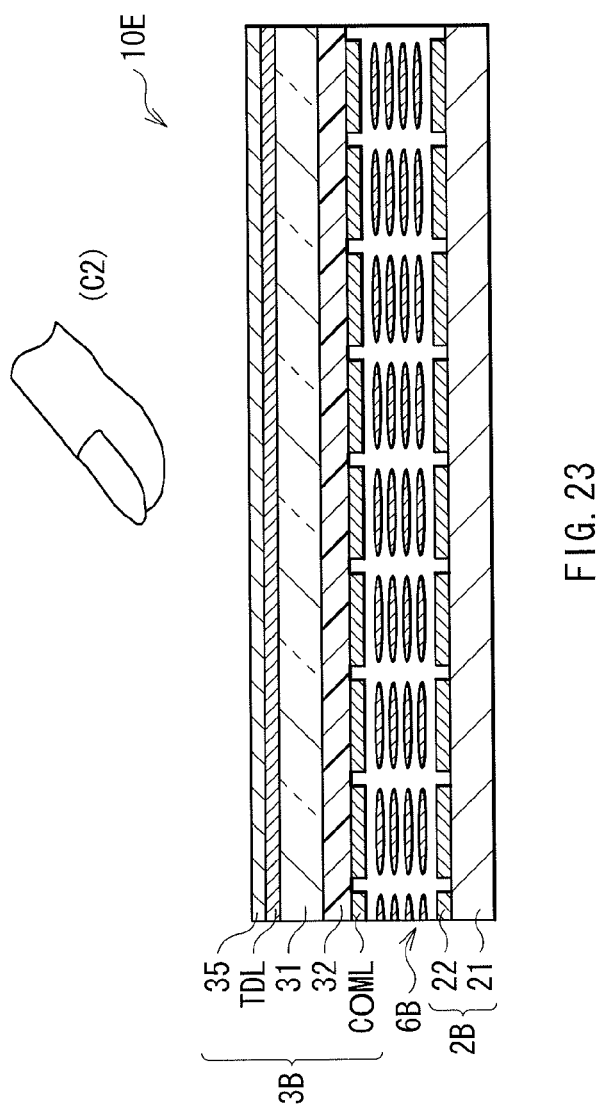
FIG. 23 is a sectional view illustrating a schematic sectional configuration of a touch detection function-equipped display device according to a modification.

For example, in the above-described embodiment and the like, the liquid crystal display device using a liquid crystal of a transverse electric field mode such as the FFS mode or the IPS mode and the touch detection device are integrated. Alternatively, a liquid crystal display device using a liquid crystal of any of various modes such as a TN (Twisted Nematic) mode, a VA (Vertical Alignment) mode, and an ECB (Electrically Controlled Birefringence) mode and the touch detection device may be integrated. In the case where such a liquid crystal is used, a touch detection function-equipped display device is configured as illustrated in FIG. 23. FIG. 23 illustrates an example of a sectional configuration of a main part of a touch detection function-equipped display device 10E according to the present modification, and illustrates a state where a liquid crystal layer 6B is sandwiched between a pixel substrate 2B and a counter substrate 3B. Names, functions, and the like of other components are similar to those in FIG. 6, and will not be further described. In this example, unlike the case illustrated in FIG. 6, the drive electrodes COML used for both of display and touch detection are formed on the counter substrate 3B.

Moreover, for example, in the above-described embodiments and the like, a so-called in-cell type in which the liquid crystal display device and the capacitive touch detection device are integrated is used; however, the disclosure is not limited thereto. Alternatively, for example, a so-called on-cell type in which a capacitive touch detection device is formed on a surface of a liquid crystal display device may be used, or a touch detection device may be provided separately, and mounted on a surface of a liquid crystal display device. For example, as in the case of the above-described embodiment, these touch detection devices each may be configured by including a drive electrode applying a drive signal (an AC drive signal VcomAC) for touch detection and a touch detection electrode allowing a capacitance to be formed between the touch detection electrode and the drive electrode. It is considered that, even in such a display panel, for example, in the case where noise of a display drive propagates from the liquid crystal display device to the touch detection device, the liquid crystal display device and the touch detection device operate in synchronization with each other. Also in this case, as in the case of the above-described embodiment, an influence of disturbance noise is suppressed by varying the frequency of the AC drive signal VcomAC.

Moreover, for example, in the above-described embodiments and the like, the touch detection device is a capacitive touch detection device, but is not limited thereto. Alternatively, the touch detection device may be, for example, an optical or resistive touch detection device.

Further, for example, in the above-described embodiment and the like, the display device is a liquid crystal device, but is not limited thereto. Alternatively, the display device may be, for example, an EL (electroluminescence) device.

In addition, for example, in the above-described embodiment and the like, the liquid crystal display device 20 and the touch detection device 30 are combined, and the display operation in the liquid crystal display device 20 and the touch detection operation in the touch detection device 30 are performed in different periods (the display period Pd and the touch detection period Pt), respectively, not to interact with each other. However, the disclosure is not limited to this case. Alternatively, for example, the liquid crystal display device 20 and a wireless communication section may be combined, and the display operation in the liquid crystal display device 20 and a wireless communication operation in the wireless communication section may be performed in different periods (the display period Pd and a wireless communication period), respectively, not to interact with each other. Also in this case, a sufficiently long wireless communication period is secured by reading data from the memory 19 at higher speed than write speed, and flexibility for wireless communication is increased.

It is to be noted that the disclosure is allowed to have the following configurations.

(1) A display unit including:

a display section;

a memory temporarily holding less than one frame of image information;

a drive section driving the display section based on the image information stored in the memory; and a processing section performing a predetermined process in conjunction with the drive section.

(2) The display unit according to (1), in which
the drive section partitions the display section into a plurality of display sub-regions each configured of two or more display lines, and performs a display drive on each of the display sub-regions, and
the memory temporarily holds image information which is to be displayed on a predetermined number of the display sub-regions.

(3) The display unit according to (2), in which
the drive section performs a display drive on the display sub-region in a first period through reading the image information from the memory at higher speed than write speed to the memory, and
the processing section performs the predetermined process in a second period different from the first period.

(4) The display unit according to (3), in which
the predetermined process is a process of detecting an external adjacent object.

(5) The display unit according to (4), in which
a touch detection region is fixed along a display plane of the display section, and
the processing section partitions the touch detection region into a plurality of detection sub-regions, and performs touch detection on each of the detection sub-regions.

(6) The display unit according to (5), in which
the display section includes
a plurality of display elements,
a plurality of touch detection electrodes extending in one direction, and
a plurality of drive electrodes extending in a direction intersecting with the direction where the touch detection electrodes extend, and
the drive section selectively applies a display drive signal and a touch detection drive signal to the drive electrodes.

(7) The display unit according to (6), in which
the detection sub-regions each correspond to a predetermined number of the drive electrodes,
the drive section applies a touch detection drive signal to the drive electrodes in each of the detection sub-regions in the second period, and
the touch detection section samples a detection signal output from the touch detection electrode at a timing in synchronization with the touch detection drive signal.

(8) The display unit according to (6) or (7), in which
the drive section varies a frequency of the touch detection drive signal.

(9) The display unit according to any one of (6) to (8), in which
a size of each detection sub-region corresponds to that of each of the display sub-regions.

(10) The display unit according to any one of (6) to (9), in which
the processing section detects the external adjacent object with use of variations in capacitance between the drive electrode and the touch detection electrode based on proximity or contact of the external adjacent object.

(11) The display unit according to (4) or (5), further including:
a plurality of drive electrodes; and
a plurality of touch detection electrodes each allowing a capacitance to be formed between the touch detection electrode and the drive electrode.

(12) A display method including:
temporarily storing less than one frame of image information in a memory, driving a display section based on the image information stored in the memory, and performing a predetermined process in conjunction with the driving of the display section.

(13) An electronic system including:
a display unit; and
a control section performing operation control with use of the display unit,
in which the display unit includes
a display section,
a memory temporarily holding less than one frame of image information,
a drive section driving the display section based on the image information stored in the memory, and
a processing section performing a predetermined process in conjunction with the drive section.

The present application contains subject matter related to that disclosed in Japanese Priority Patent Application 2011-215862 filed in the Japan Patent Office on Sep. 30, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display unit comprising:
a display section;
a memory controlled such that two or more sets of image information are written into the memory during one frame period, each of the two or more sets of image information being less than one frame of image information, each set of image information being written into the memory by overwriting the previous set of image information in the memory;
a drive section configured to partition the display section into a plurality of display sub-regions each configured of two or more display lines, and performs a display drive on each display sub-region in a first period through reading the image information from the memory at a higher speed than a write speed to the memory; and
a processing section configured to perform a predetermined process in conjunction with the drive section in a second period different from the first period,
wherein,
a length of each writing period for writing the less than one frame of image information into the memory is constant, and
each writing period overlaps the first period and the second period.

2. The display unit according to claim 1, wherein
the memory temporarily holds image information which is to be displayed on a predetermined number of the display sub-regions.

3. The display unit according to claim 1, wherein the predetermined process is a process of detecting an external adjacent object.

4. The display unit according to claim 3, wherein:
a touch detection region is fixed along a display plane of the display section, and
the processing section partitions the touch detection region into a plurality of detection sub-regions, and performs touch detection on each of the detection sub-regions.

5. The display unit according to claim 4, wherein:
the display section includes (a) a plurality of display elements, (b) a plurality of touch detection electrodes extending in one direction, and (c) a plurality of drive electrodes extending in a direction intersecting with the extending direction of the touch detection electrodes, and the drive section selectively applies a display drive signal and a touch detection drive signal to the drive electrodes.

6. The display unit according to claim 5, wherein:

the detection sub-regions each correspond to a predetermined number of the drive electrodes, the drive section applies a touch detection drive signal to the drive electrodes in each of the detection sub-regions in the second period, and the touch detection section samples a detection signal output from the touch detection electrode at a timing in synchronization with the touch detection drive signal.

7. The display unit according to claim 5, wherein the drive section varies a frequency of the touch detection drive signal.

8. The display unit according to claim 5, wherein a size of each detection sub-region corresponds to that of each of the display sub-regions.

9. The display unit according to claim 5, wherein the processing section detects the external adjacent object with use of variations in capacitance between the drive electrode and the touch detection electrode based on proximity or contact of the external adjacent object.

10. The display unit according to claim 3, further comprising:

a plurality of drive electrodes; and a plurality of touch detection electrodes each allowing a capacitance to be formed between the touch detection electrode and the drive electrode.

11. A display method comprising:

writing two or more sets of image information into a memory during one frame period, each of the two or more sets of image information being less than one frame of image information, each set of image information being written into the memory by overwriting the previous set of image information in the memory;

partitioning the display section into a plurality of display sub-regions in which each is configured of two or more display lines, and performing a display drive on each display sub-region in a first period by reading the image information from the memory at a higher speed than a write speed to the memory, and performing a predetermined process in conjunction with the driving of the display section in a second period different from the first period, wherein, a length of each writing period for writing the less than one frame of image information into the memory is constant, and each writing period overlaps the first period and the second period.

12. An electronic system comprising:

a display unit; and a control section performing operation control with use of the display unit, wherein, the display unit includes a display section, a memory controlled such that two or more sets of image information are written into the memory during one frame period, each of the two or more sets of image information being less than one frame of image information, each set of image information being written into the memory by overwriting the previous set of image information in the memory, a drive section configured to partition the display section into a plurality of display sub-regions that are each configured of two or more display lines, and perform a display drive on each display sub-region in a first period by reading the image information from the memory at a higher speed than a write speed to the memory, and a processing section configured to perform a predetermined process in conjunction with the drive section in a second period different from the first period, wherein, a length of each writing period for writing the less than one frame of image information into the memory is constant, and each writing period overlaps the first period and the second period.

13. The display unit according to claim 1, wherein:

in a predetermined timing between a start timing and an end timing of the first period, a former write period of two successive write periods ends, and a latter write period of the two successive write periods starts, and a length of time from the start timing to the predetermined timing is substantially equal to a length of time from the predetermined timing to the end timing.

* * * * *